United States Patent [19]

Peters

[11] Patent Number: 4,720,751
[45] Date of Patent: Jan. 19, 1988

[54] VIDEO RECORDING APPARATUS WHICH RECORDS CHROMINANCE INFORMATION AT A LOWER FREQUENCY BAND COINCIDENT WITH THE LUMINANCE SIGNAL FREQUENCY BAND

[75] Inventor: Joseph H. Peters, Eindhoven, Netherlands

[73] Assignee: U.S. Philips Corporation, New York, N.Y.

[21] Appl. No.: 841,035

[22] Filed: Mar. 17, 1986

Related U.S. Application Data

[63] Continuation of Ser. No. 472,892, Mar. 7, 1983, abandoned.

[30] Foreign Application Priority Data

Jan. 11, 1983 [NL] Netherlands .................. 8200077

[51] Int. Cl.⁴ .................................... H04N 9/491
[52] U.S. Cl. .................................... 358/310; 358/138; 358/12; 358/330
[58] Field of Search .................. 358/12, 23, 310, 330, 358/133, 138; 364/725; 360/30, 33, 26

[56] References Cited

U.S. PATENT DOCUMENTS

| | | | |
|---|---|---|---|
| 3,679,821 | 7/1972 | Schroeder | 358/138 |
| 3,975,761 | 8/1976 | Taudt et al. | 360/32 X |
| 3,984,626 | 10/1976 | Mounts et al. | 358/133 X |
| 4,048,658 | 9/1977 | Nakagawa | 360/22 X |
| 4,068,265 | 1/1978 | Russell | 358/133 |
| 4,125,865 | 11/1978 | Mohammadioun | 360/32 |
| 4,168,509 | 9/1979 | Hartman | 135/138 |
| 4,176,373 | 11/1979 | Dillon et al. | 358/138 X |
| 4,179,709 | 12/1979 | Workman | 358/138 X |
| 4,204,227 | 5/1980 | Gurley | 358/133 X |
| 4,285,014 | 8/1981 | Satoh | 360/331 X |
| 4,312,019 | 1/1982 | Kimura | 360/22 |
| 4,329,718 | 5/1982 | Kimura | 360/22 X |
| 4,393,418 | 7/1983 | Kimura | 360/22 |
| 4,396,953 | 8/1983 | Fujita et al. | 358/328 |
| 4,398,217 | 8/1983 | Peters | 358/138 |
| 4,531,151 | 7/1985 | Hentschke | 358/138 X |

FOREIGN PATENT DOCUMENTS

57-004675  1/1982  Japan .................. 358/133

OTHER PUBLICATIONS

"An Experimental Digital Videotape Recorder", Yokoyama et al., SMPTE Journal, Mar. 1980, vol. 89, pp. 173–180.
"Intraframe Image Coding by Luscoded Hadamard Transforms", IEEE Transactions on Com., vol. Com.-24, No. 3, Mar. 1973; Fukinaki et al., pp. 175–179—copy in ex's library.

Primary Examiner—Aristotelis M. Psitos
Attorney, Agent, or Firm—Thomas A. Briody; Jack Oisher; William J. Streeter

[57] ABSTRACT

The present invention provides a transmission method denoted as the "color shift" method. Therein the composite color video signal, which is formed by a sequence of analog line signals, is sampled, as a result of which each analog line signal is converted into a time-discrete line signal formed by a plurality of line signal samples occurring at a rate $f_s$, each sample being formed from the sum of a luminance and a chrominance signal sample. Thereafter, these time-discrete line signals are submitted to a scrambling operation in which, in accordance with a predetermined pattern, a number of line signal samples is, each time, selected from the line signal samples of a group of time-discrete line signals for assembling time-discrete auxiliary line signals. This selection is effected such that of all those line signal samples which together represent a given time-discrete auxiliary line signal, the associated chrominance signal samples all have the same polarities. As a result thereof the chrominance signal is converted without bandwidth limitation to a lower frequency band, while it continues to be located within the frequency band occupied by the luminance signal. This new composite color video signal can now, after having been converted into an analog signal, be transposed in its totality to a suitable transmission band by means of frequency modulation.

6 Claims, 42 Drawing Figures

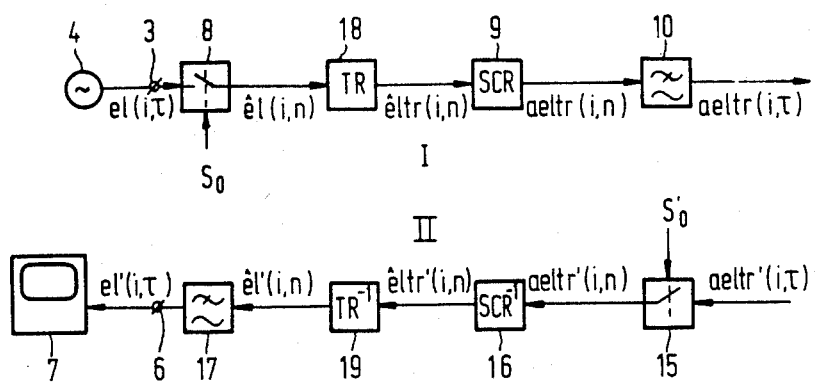
FIG.13
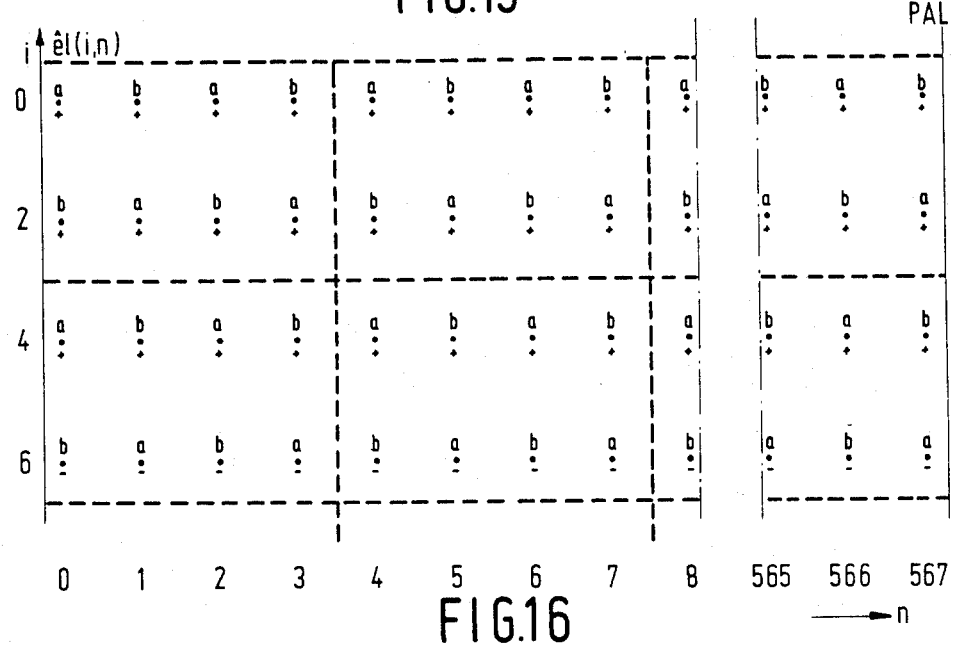
FIG.16
$$H = \frac{1}{2} \begin{Vmatrix} 1 & 1 & 0 & 0 & 1 & -1 & 0 & 0 \\ 1 & 1 & 0 & 0 & -1 & 1 & 0 & 0 \\ 0 & 0 & 2 & 0 & 0 & 0 & 0 & 0 \\ 0 & 0 & 0 & 2 & 0 & 0 & 0 & 0 \\ 1 & -1 & 0 & 0 & 1 & 1 & 0 & 0 \\ -1 & 1 & 0 & 0 & 1 & 1 & 0 & 0 \\ 0 & 0 & 0 & 0 & 0 & 0 & 2 & 0 \\ 0 & 0 & 0 & 0 & 0 & 0 & 0 & 2 \end{Vmatrix}$$
FIG.17

$$VG = \begin{Vmatrix} êl\,(i_1,p_1Q) \\ êl\,(i_1,p_1Q+1) \\ \vdots \\ êl\,(i_1,p_1Q+Q-1) \\ êl\,(i_2,p_2Q) \\ êl\,(i_2,p_2Q+1) \\ \vdots \\ êl\,(i_2,p_2Q+Q-1) \\ êl\,(i_3,p_3) \\ êl\,(i_3,p_3Q+1) \\ \vdots \\ êl\,(i_3,p_3Q+Q-1) \\ \\ \vdots \\ \\ êl\,(i_R,p_RQ) \\ êl\,(i_R,p_RQ+1) \\ \vdots \\ êl\,(i_R,p_RQ+Q-1) \end{Vmatrix}$$

$$\begin{Vmatrix} êltr\,(i_1,p_1Q) \\ êltr\,(i_1,p_1Q+1) \\ \vdots \\ êltr\,(i_1,p_1Q+Q-1) \\ êltr\,(i_2,p_2Q) \\ êltr\,(i_2,p_2Q+1) \\ \vdots \\ êltr\,(i_2,p_2Q+Q-1) \\ êltr\,(i_3,p_3Q) \\ êltr\,(i_3,p_3Q+1) \\ \vdots \\ êltr\,(i_3,p_3Q+Q-1) \\ \\ \vdots \\ \\ êltr\,(i_R,p_RQ) \\ êltr\,(i_R,p_RQ+1) \\ \vdots \\ êltr\,(i_R,p_RQ+Q-1) \end{Vmatrix} = VGTR$$

FIG.14                FIG.15

| CNT | ADD | TP | $\hat{e}1_i(i,n)$ |
|---|---|---|---|
| 0 | 0 | 1 | $i_1, 0$ |
| 1 | 1 | 0 | $, 1$ |
| 2 | 2 | 0 | $, 2$ |
| 3 | 3 | 0 | $, 3$ |
| 4 | 1135 | 0 | $i_1+2, 0$ |
| 5 | 1136 | 0 | $, 1$ |
| 6 | 1137 | 0 | $, 2$ |
| 7 | 1138 | 0 | $, 3$ |
| 8 | 4 | 1 | $i_1, 4$ |
| 9 | 5 | 0 | $, 5$ |
| 10 | 6 | 0 | $, 6$ |
| 11 | 7 | 0 | $, 7$ |
| 12 | 1139 | 0 | $i_1+2, 4$ |
| 13 | 1140 | 0 | $, 5$ |
| 14 | 1141 | 0 | $, 6$ |
| 15 | 1142 | 0 | $, 7$ |
| 16 | 8 | 1 | $i_1, 8$ |
| 17 | 9 | 0 | $, 9$ |
| 18 | 10 | 0 | $, 10$ |
| 19 | 11 | 0 | $, 11$ |
| 20 | 1143 | 0 | $i_1+2, 8$ |
| 21 | 1144 | 0 | $, 9$ |
| 22 | 1145 | 0 | $, 10$ |
| 23 | 1146 | 0 | $, 11$ |
| 24 | 12 | 1 | $i_1, 12$ |
| 25 | 13 | 0 | $, 13$ |
| 26 | 14 | 0 | $, 14$ |
| 27 | 15 | 0 | $, 15$ |
| 28 | 1147 | 0 | $i_1+2, 12$ |
| 29 | 1148 | 0 | $, 13$ |
| ⋮ | ⋮ | ⋮ | $, 14$ |
| | | | $, 15$ |
| | | | ⋮ |
| | | 1 | |
| | | 0 | |
| | | 0 | |
| ⋮ | ⋮ | | ⋮ |
| 2259 | 1131 | 0 | $i_1+1, 563$ |
| 2260 | 2263 | 0 | $i_1+3, 560$ |
| 2261 | 2264 | 0 | $, 561$ |
| 2262 | 2265 | 0 | $, 562$ |
| 2263 | 2266 | 0 | $, 563$ |
| 2264 | 1132 | 1 | $i_1+1, 564$ |
| 2265 | 1133 | 0 | $565$ |
| 2266 | 1134 | 0 | $566$ |
| 2267 | 1134 | 0 | $566$ |
| 2268 | 2267 | 0 | $i_1+3, 564$ |
| 2269 | 2268 | 0 | $, 565$ |
| 2270 | 2269 | 0 | $, 566$ |
| 2271 | 2269 | 0 | $, 566$ |

FIG.21

$$H = \frac{1}{2} \begin{Vmatrix} 1 & 1 & 0 & 0 & 1 & -1 & 0 & 0 \\ -1 & 1 & 0 & 0 & 1 & 1 & 0 & 0 \\ 0 & 0 & 2 & 0 & 0 & 0 & 0 & 0 \\ 0 & 0 & 0 & 2 & 0 & 0 & 0 & 0 \\ 1 & -1 & 0 & 0 & 1 & 1 & 0 & 0 \\ 1 & 1 & 0 & 0 & -1 & 1 & 0 & 0 \\ 0 & 0 & 0 & 0 & 0 & 0 & 2 & 0 \\ 0 & 0 & 0 & 0 & 0 & 0 & 0 & 2 \end{Vmatrix}$$

$$H = \frac{1}{2} \begin{Vmatrix} 1 & 1 & 0 & 0 & 1 & -1 & 0 & 0 \\ -1 & 1 & 0 & 0 & 1 & 1 & 0 & 0 \\ 0 & 0 & 0 & 0 & 0 & 0 & 2 & 0 \\ 0 & 0 & 0 & 2 & 0 & 0 & 0 & 0 \\ 1 & -1 & 0 & 0 & 1 & 1 & 0 & 0 \\ 1 & 1 & 0 & 0 & -1 & 1 & 0 & 0 \\ 0 & 0 & 2 & 0 & 0 & 0 & 0 & 0 \\ 0 & 0 & 0 & 0 & 0 & 0 & 0 & 2 \end{Vmatrix}$$

$$H_0 = \begin{Vmatrix} 1 & 0 & 0 & 0 \\ 0 & 1 & 0 & 0 \\ 0 & 0 & 1 & 0 \\ 0 & 0 & 0 & 1 \end{Vmatrix}$$
FIG.30
$$H = \tfrac{1}{2} \begin{Vmatrix} 1 & 1 & 1 & -1 \\ 1 & 1 & -1 & 1 \\ 1 & -1 & 1 & 1 \\ -1 & 1 & 1 & 1 \end{Vmatrix}$$
FIG.31
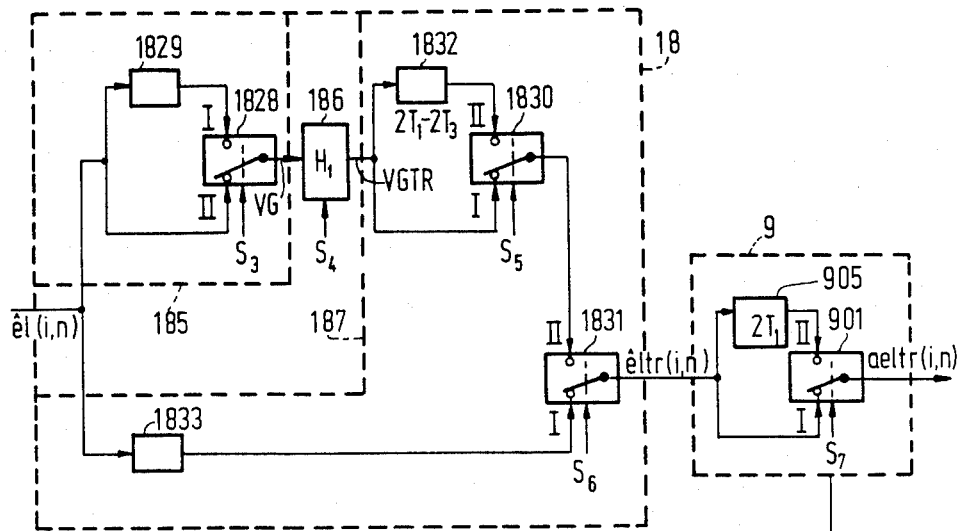
FIG.32
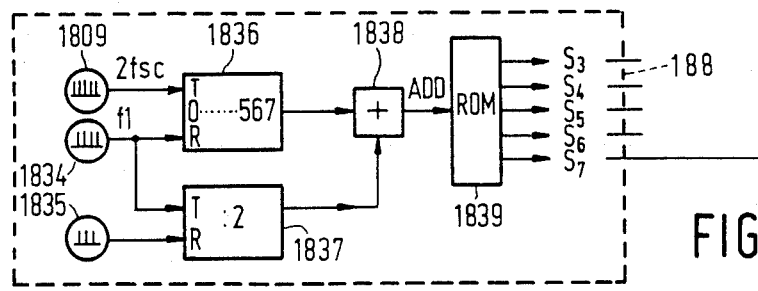
FIG.33

| CNT | RA | TP | ê(i,n) i | n |
|---|---|---|---|---|
| 0 | 0 | 1 | $i_1$ | 0 |
| 1 | 1 | 0 | | 1 |
| 2 | 2 | 0 | | 2 |
| 3 | 3 | 0 | | 3 |
| 4 | 455 | 0 | $i_1+1$ | 0 |
| 5 | 456 | 0 | | 1 |
| 6 | 457 | 0 | | 2 |
| 7 | 458 | 0 | | 3 |
| 8 | 4 | 1 | $i_1$ | 4 |
| 9 | 5 | 0 | | 5 |
| 10 | 6 | 0 | | 6 |
| 11 | 7 | 0 | | 7 |
| 12 | 459 | 0 | $i_1+1$ | 4 |
| 13 | 460 | 0 | | 5 |
| 14 | 461 | 0 | | 6 |
| 15 | 462 | 0 | | 7 |
| 16 | 8 | 1 | $i_1$ | 8 |
| 17 | 9 | 0 | | 9 |
| 18 | 10 | 0 | | 10 |
| 19 | 11 | 0 | | 11 |
| 20 | 463 | 0 | $i_1+1$ | 8 |
| 21 | 464 | 0 | | 9 |
| 22 | 465 | 0 | | 10 |
| 23 | 466 | 0 | | 11 |
| 24 | 12 | 1 | $i_1$ | 12 |
| 25 | 13 | 0 | | 13 |
| 26 | 14 | 0 | | 14 |
| 27 | 15 | 0 | | 15 |
| 28 | 467 | 0 | $i_1+1$ | 12 |
| 29 | 468 | 0 | | 13 |
| ⋮ | ⋮ | ⋮ | ⋮ | ⋮ |
| 904 | 452 | 1 | $i_1$ | 452 |
| 905 | 453 | 0 | | 453 |
| 906 | 454 | 0 | | 454 |
| 907 | 454 | 0 | | 454 |
| 908 | 907 | 0 | $i_1+1$ | 452 |
| 909 | 908 | 0 | | 453 |
| 910 | 909 | 0 | | 454 |
| 911 | 909 | 0 | | 454 |

FIG.40

VIDEO RECORDING APPARATUS WHICH RECORDS CHROMINANCE INFORMATION AT A LOWER FREQUENCY BAND COINCIDENT WITH THE LUMINANCE SIGNAL FREQUENCY BAND

This is a continuation of co-pending application Ser. No. 472,892 filed on Mar. 7, 1983, now abandoned.

A. BACKGROUND OF THE INVENTION

A(1). Field of the Invention

The invention relates to a video recorder arranged to receive a composite color video signal and to record it on a magnetic tape or another means. This recorder is further arranged to convert the information recorded on the magnetic tape into the original composite color video signal which can be applied to a standard color TV receiver for display on a TV screen.

A(2). Description of the Prior Art

As is known, a composite color video signal is formed by the sum of a luminance signal y(t) and a chrominance signal chr(t). The luminance signal has a frequency spectrum Y(f) located in the frequency band extending from 0 Hz to approximately 5.5 MHz. The chrominance signal has a frequency spectrum CHR (f) located within the frequency band of the luminance signal, more specifically in that portion of this frequency band located between the frequencies 3 MHz and 5.5 MHz.

A composite color video signal may alternatively be considered as a sequence of line signals which each correspond to a picture line of the TV-picture and are each present during a period of time $T_l$ which is designated the line period.

The magnetic tape on which the above-mentioned composite color video signal must be recorded, may be considered to be a transmission medium having a transmission band which extends from a low frequency $f_A$ to a higher frequency $f_B$. Herein $f_A$ is considerably higher than zero Hertz; in practice it is approximately 200 kHz. The frequency $f_B$ is inter alia determined by the tape speed. The higher the tape speed, the higher $f_B$, but also the greater the quantity of tape "consumed" per second. In addition to the fact that no low frequency component can be transmitted via this transmission medium, it introduces transmission noise, the energy of which is uniformly distributed over the overall transmission band.

If the composite color video signal is directly recorded on the magnetic tape, then the quality of the recovered video signal is very poor because it no longer contain low-frequency luminance components and because the luminance and chrominance signals are both highly affected by the transmission noise.

In order to prevent the loss of low-frequency luminance components, it has already been proposed to modulate the color video signal on a carrier signal which has such a high carrier frequency that the lowest frequency component in the modulated color video signal is well above $f_A$. In addition, frequency modulation is applied so that the distribution of the energy of the transmission noise over the transmission band is shaped. More specifically, frequency modulation reduces the noise energy for the lower frequencies and inceases the noise energy for the higher frequencies in the transmission band. In order to prevent the chrominance signal, and consequently the color rendering, from being increasingly adversely affected by this shaping of the noise energy, a high carrier frequency of, for example, 10 MHz and a very high tape speed are required. Although a very good transmission quality is accomplished by means of this transmission method, it is only used in professional video recorders. For video recorders for the consumer's market, the very high tape speed is unacceptable.

A different transmission method is therefore used in the last-mentioned video recorders, as a result of which a reasonable transmission quality is accomplished with a low tape speed. More specifically, the chrominance signal is separated from the luminace signal by means of a high or band-pass filter. A carrier signal which has a nominal frequency of approximately 4 MHz is frequency-modulated with the luminance signal thus obtained. Of the resultant FM-signal, that portion is selected which is located in the frequency band extending from approximately 1 MHz to approximately 7 MHz. This portion is directly recorded on the magnetic tape. That portion of the transmission band which is located between the frequencies $f_A$ and 1 MHz is now used to transmit the chrominance signal. To that end, the bandwidth of the separated chrominance signal is first very greatly limited to approximately 4 kHz and is thereafter converted by means of amplitude modulation to the frequency band extending from $f_A$ to approximately 1 MHz and this converted signal is directly recorded on the magnetic tape.

The transmission method, which is known as "color under", has the disadvantage that the bandwidth of the luminance signal is very greatly limited, as a result of which much luminance information is lost. As this luminance signal is transmitted over the transmission channel by means of frequency modulation, the influence of the transmission noise on this luminance signal is acceptable.

This transmission method has the further disadvantage that the chrominance signal is transmitted over the transmission channel by means of amplitude modulation, the carrier frequency in practice being 562 kHz. As a result thereof, no shaping is obtained of the distribution of the noise energy of the transmission noise present in that portion of the transmission band which extends from $f_A$ to approximately 1 MHz. This results in this converted chrominance signal being significantly affected by the transmission noise. As moreover the bandwidth of the converted chrominance signal is considerably smaller than the bandwidth of the original chrominance signal, the transmission quality of the chrominance signal is not very good in this transmission method.

B. OBJECT AND SUMMARY OF THE INVENTION

It is an object of the invention to provide a video recorder in which a very good transmission quality is combined with a low tape speed, by applying a different transmission method.

According to the invention, this recorder comprises:

a. A recorder input for receiving an analog color video signal formed by a sequence of analog line signals.

b. A converter for converting an analog signal into a time-discrete signal, the converter having an input which is coupled to the recorder input converting each analog line signal into a time-discrete line signal formed by a number of video signal samples occurring at a rate $f_s$, which number is equal to $N_i$ for the $i^{th}$ time-discrete line signal.

c. A scrambler having an input coupled to the output of the converter, and an output, and in which a scrambling operation is effected in accordance with a predetermined pattern. A number of time-discrete line signals is selected from the signal samples out of a group of these line signals applied thereto for producing a time-discrete auxiliary line signal, the $i^{th}$ time-discrete auxiliary line signal comprising $N_i$ of such signal samples.

d. A cascade arrangement of a frequency-modulation arrangement and an arrangement for converting a time-discrete signal into an analog signal, the auxiliary line signals being applied to this cascade arrangement, the cascade arrangement producing an analog output signal which represents a carrier signal which is frequency-modulated by the analog versions of the time-discrete auxiliary line signals.

The frequency-modulated carrier signal produced by the cascade arrangement is recorded in a conventional manner on the magnetic tape by means of a recording head.

The use of the measures in accordance with the invention accomplish that the frequency band occupied by the chrominance signal in the original analog color video signal is shifted to low frequencies without its bandwidth being limited, and this frequency band continues to coincide, as also in the original analog color video signal, with the frequency band occupied by the luminance signal. As the converted chrominance signal is transmitted by means of frequency modulation, this chrominance signal is only affected to a limited extent by the transmission noise. Because of the new position of the frequency band occupied by this chrominance signal, it was found to be unnecessary to increase, for an adequate suppression of the transmission noise, the tape speed customary for consumer apparatus.

As has already been mentioned in the foregoing, the frequency band occupied by the chrominance signal continues to coincide with the frequency band occupied by the luminance signal. This means that the last-mentioned frequency band may be wider than in the "color under" transmission method.

C. REFERENCES

1. Digital Video: Sub-Nyquist Sampling of PAL Colour Singals; V. G. Devereux; B.B.C. Research Department, Report No. BBC RD 1975/4; January 1975.

2. Sub-Nyquist Sampled PCM NTSC Colour Signal Derived from Four Times the Colour Subcarrier Sampled Signal; J. P. Rossi; IBC 78, Conference Publication No. 166, pages 218-221.

D. SHORT DESCRIPTION OF THE FIGURES

Figure 2:
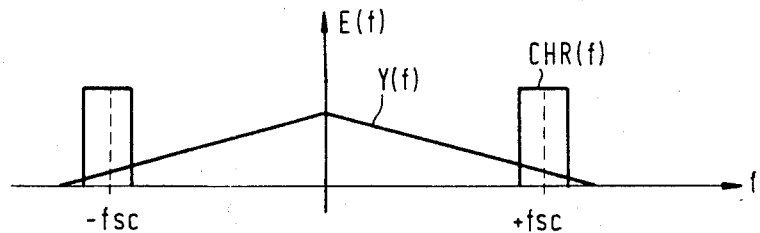
FIG. 2 shows schematically the frequency spectrum of a composite color video signal.
Figure 8:
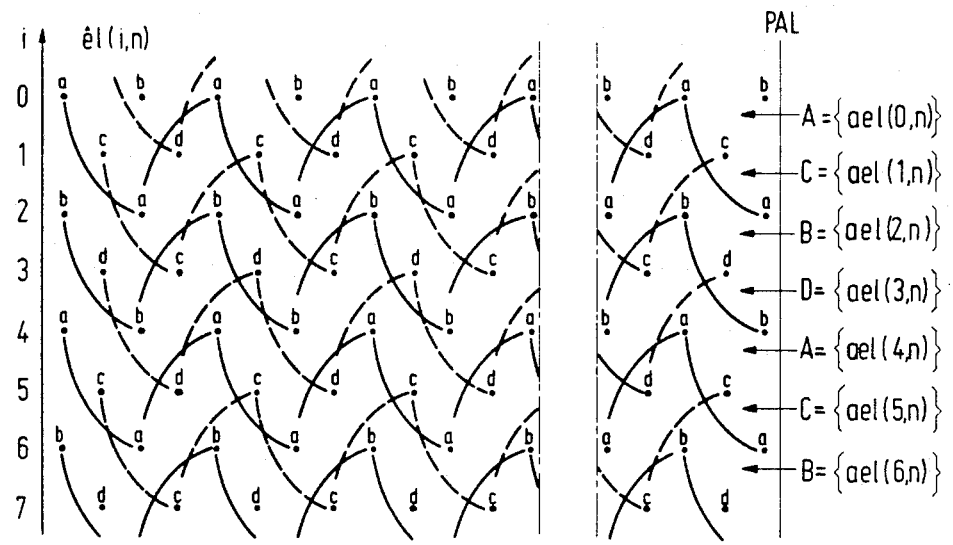
FIG. 8 shows an example of a scrambling operation effected in the scrambler.
Figure 9:
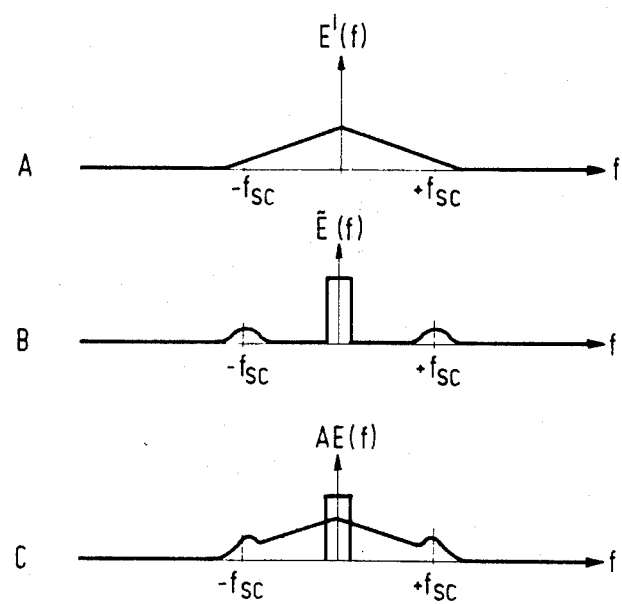
Figure 10:
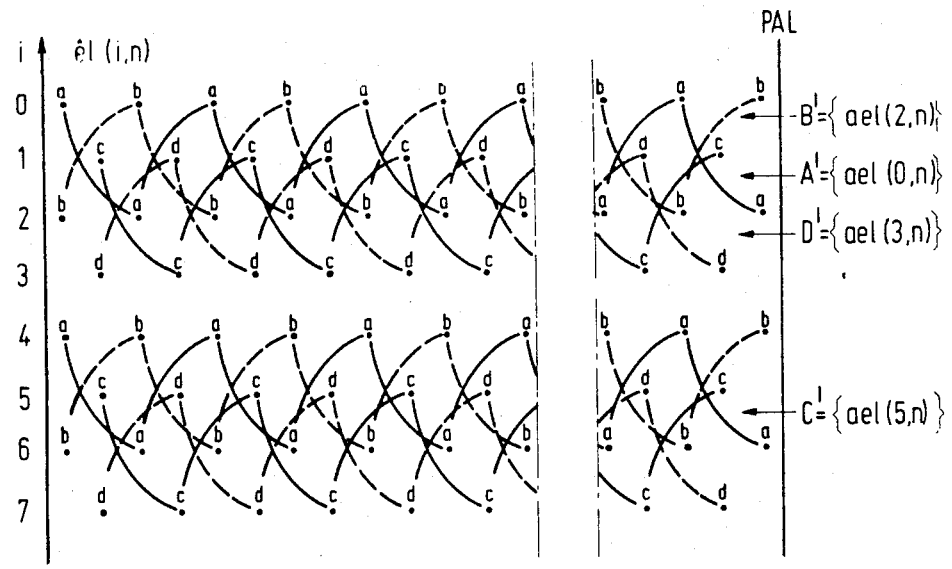
Figure 11:
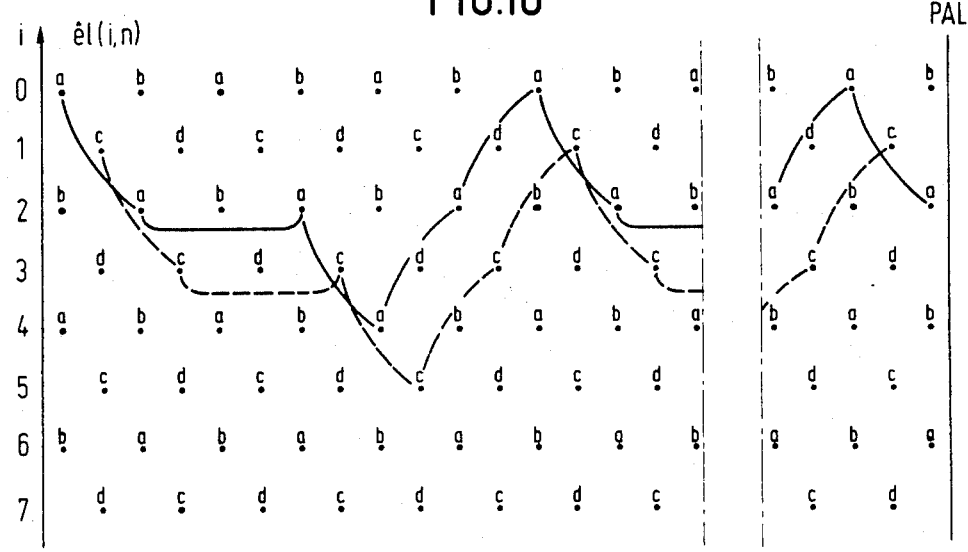
Figure 12:
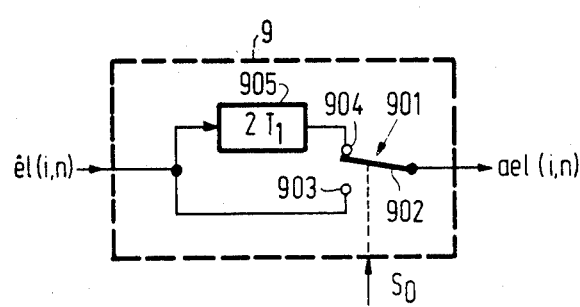
Figure 18:
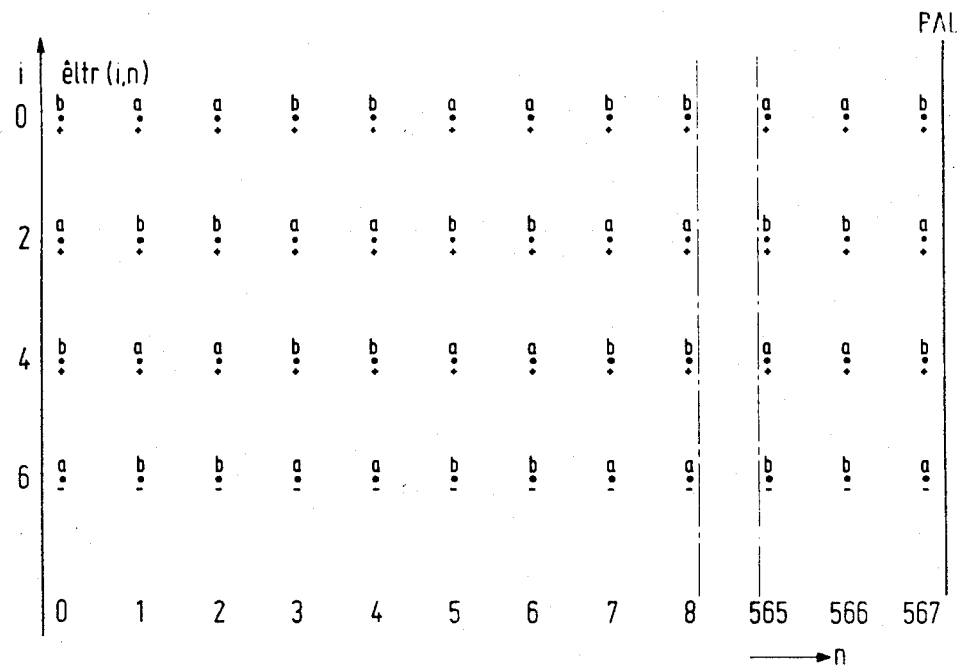
Figure 20:
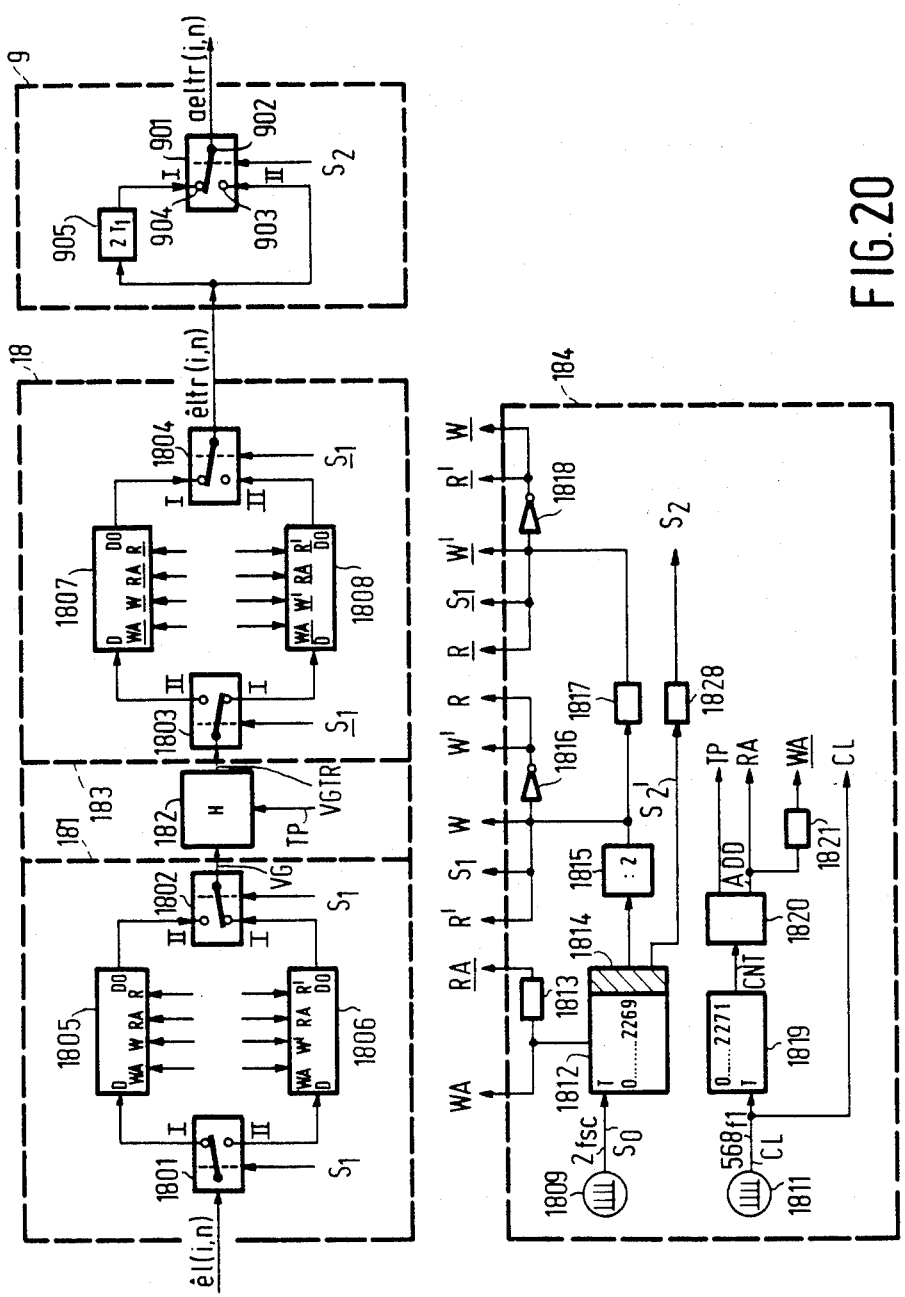
Figure 22:
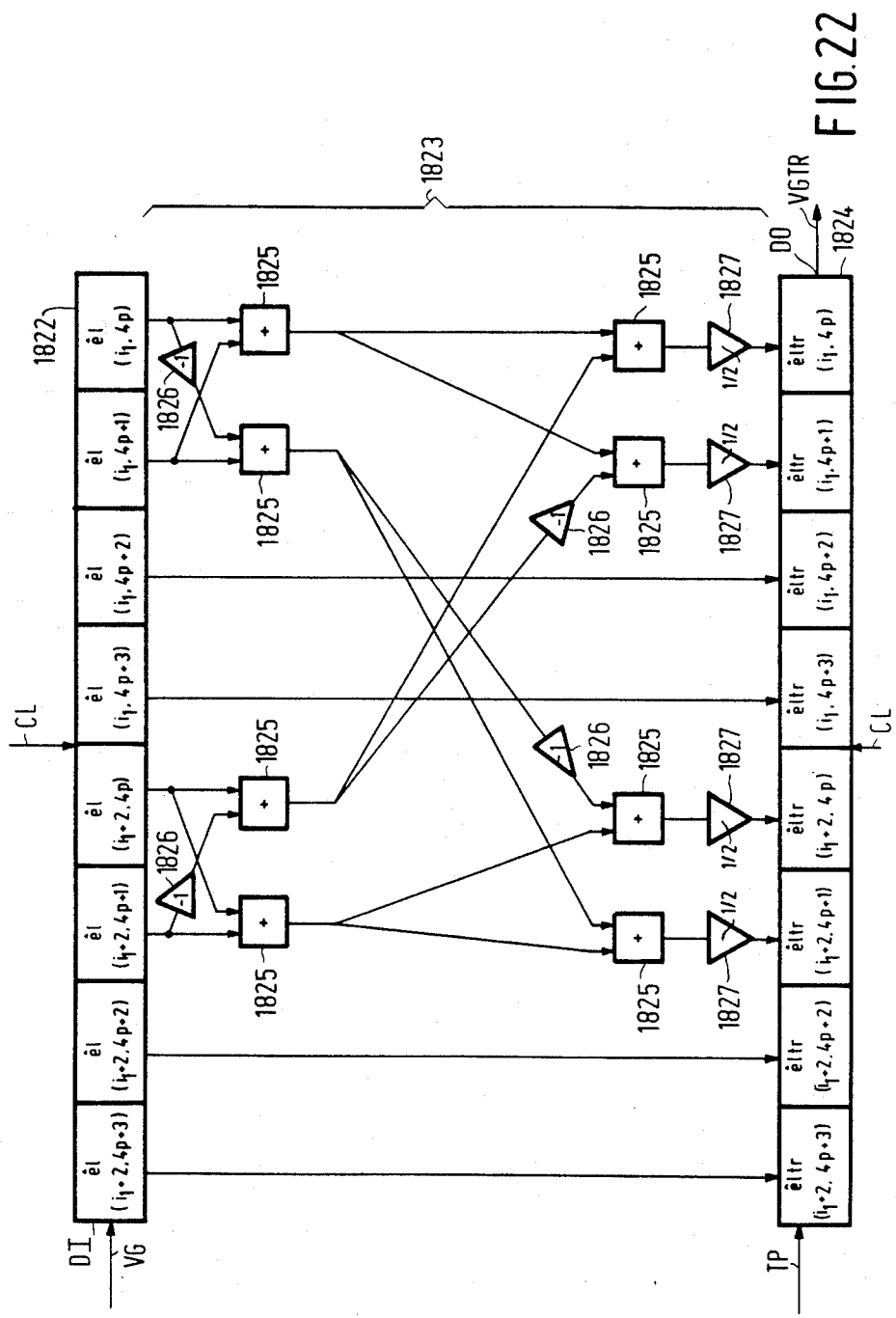
Figures 23, 24, 25:
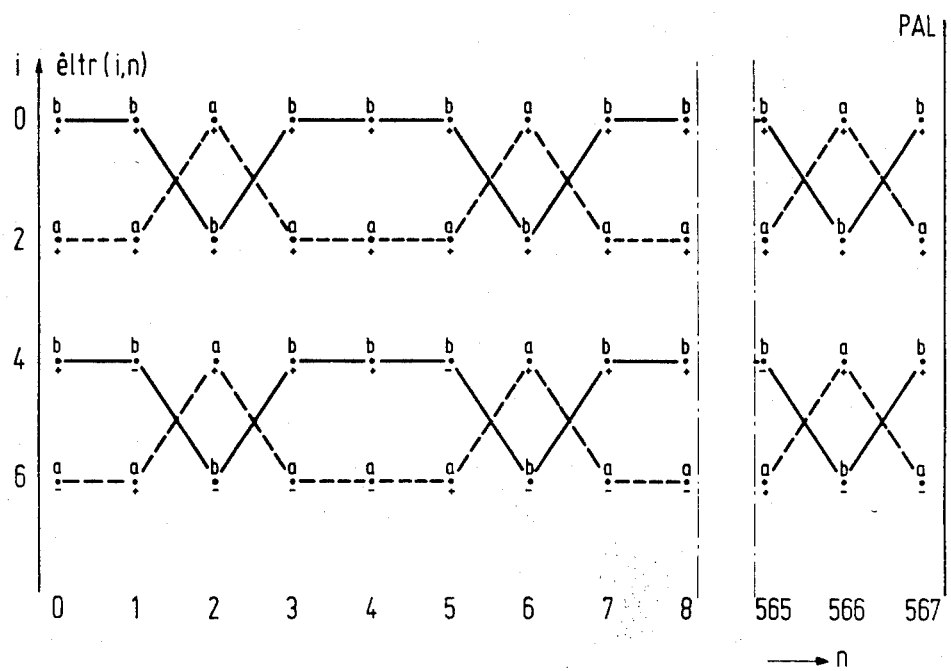
Figure 26:
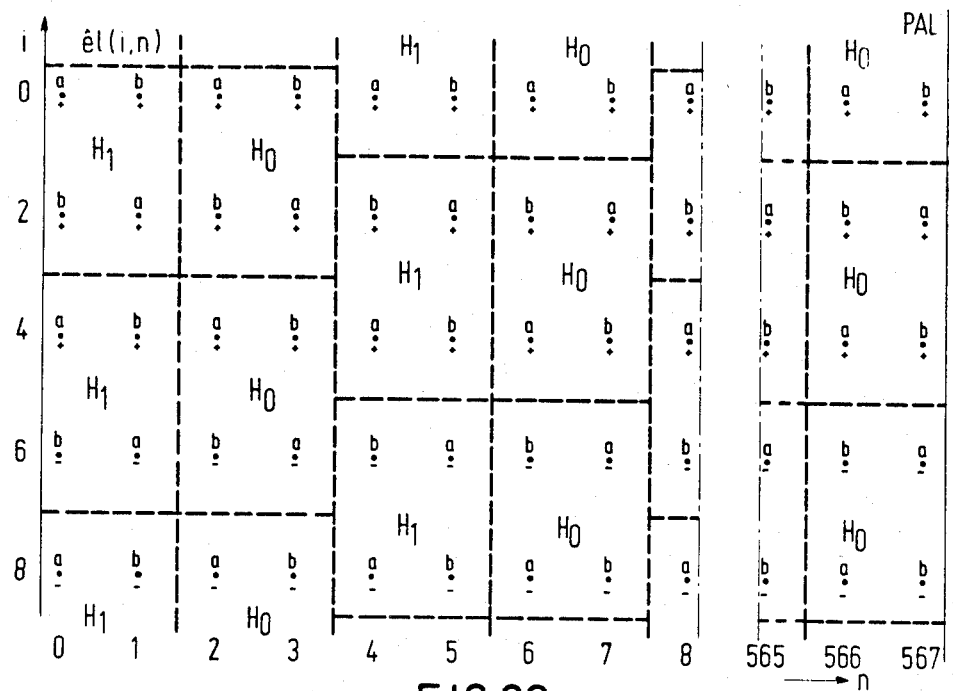
Figure 34:
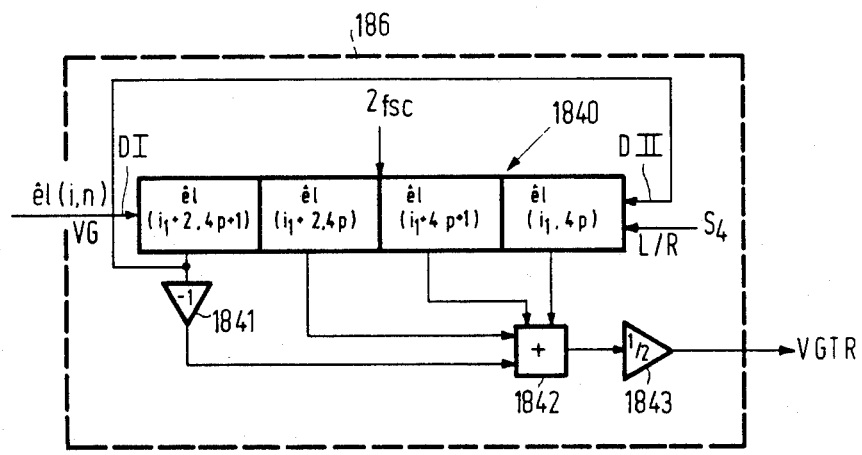
Figure 35:
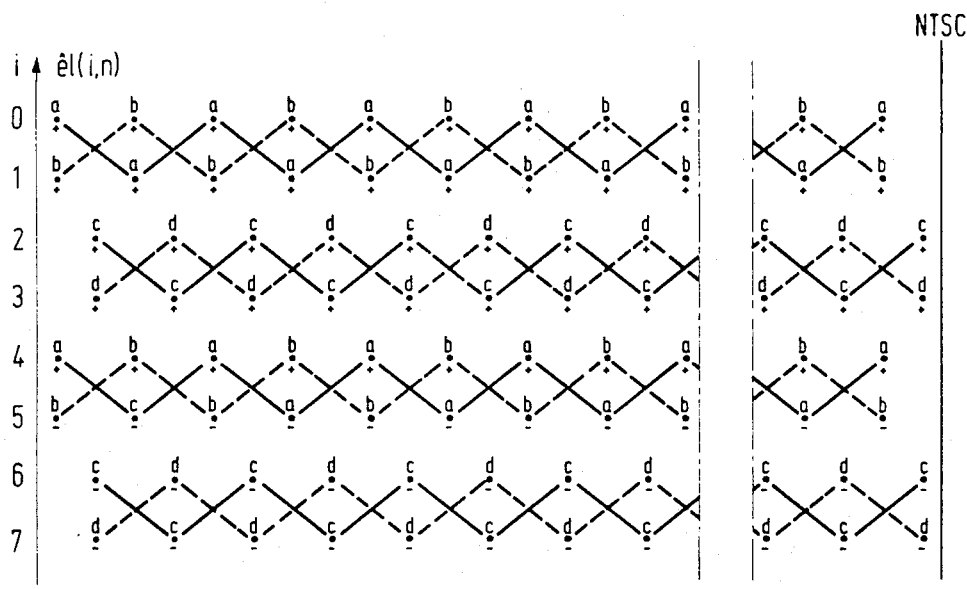
Figure 37:
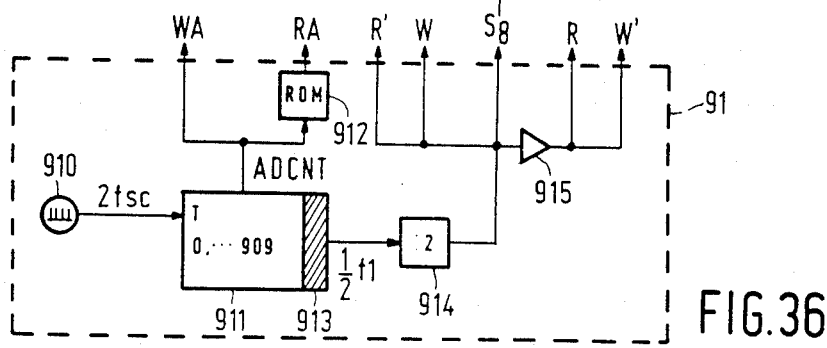
Figure 36:
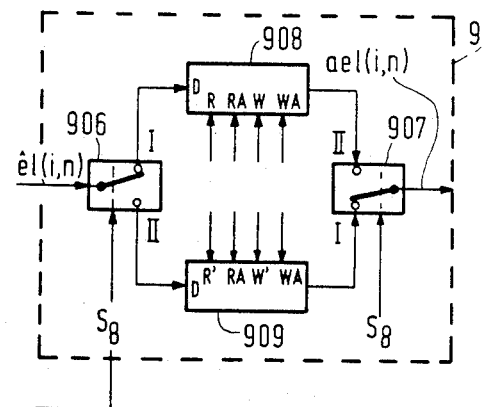
Figure 38:
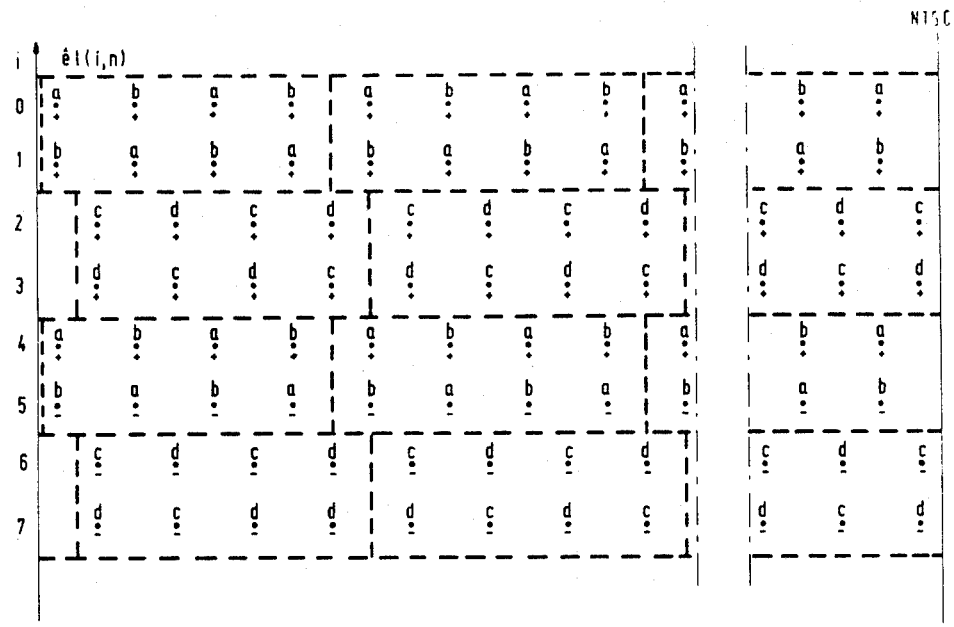
Figure 39:
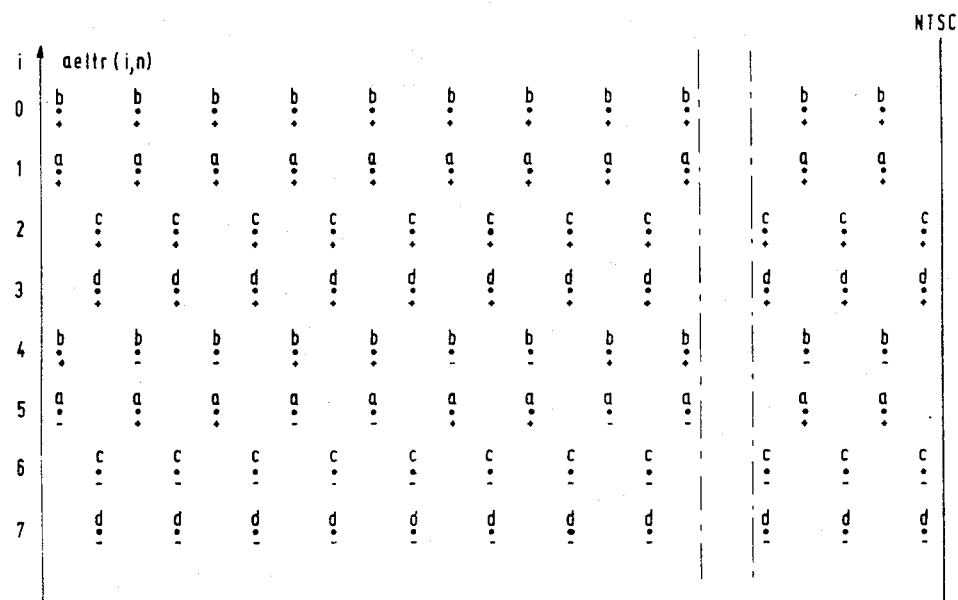

FIG. 9, A-C, shows some frequency diagrams to explain the effect obtained with the scrambling operation shown in FIG. 8;

FIG. 10 and FIG. 11 show each a further example of a scrambling operation which can be effected in the scrambler;

FIG. 12 shows an embodiment of a scrambler;

FIG. 13 shows a further embodiment of the video recorder in accordance with the invention;

The FIGS. 14, 15, 16, 17, 18, 19 serve to explain the transformation procedure and the subsequent scrambling procedure as applied in the recorder shown in FIG. 13;

FIG. 20 shows an embodiment of a transform arrangement and the subsequent scrambler;

FI. 21 shows a Table for explaining the operation of the transform arrangement shown in FIG. 20;

FIG. 22 shows an embodiment of an auxiliary transformer for use in the transform arrangement shown in FIG. 20;

FIG. 23 shows a transformation matrix on which the construction of the transform arrangement may be based;

FIG. 24 shows some transformed line signals produced by the transform arrangement shown in FIG. 20, if the construction thereof is based on the transformation matrix shown in FIG. 23;

FIG. 25 shows a transformation matrix which at the same time includes the scrambling operation;

FIGS. 26, 27, 28, 29, 30, 31 serve to explain the transformation procedure and the subsequent scrambling procedure which is effected in the embodiment shown in FIG. 32;

FIG. 32 shows another embodiment of a transform arrangement and of a scrambler;

FIG. 33 shows the relationship between a number of signals occurring in the embodiment shown in FIG. 32;

FIG. 34 shows an auxiliary transformer for use in the transform arrangement shown in FIG. 32;

FIG. 35 illustrates a scrambling operation for NTSC video signals;

FIG. 36 shows a scrambler for effecting the scrambling operation shown in FIG. 35;

FIG. 37 is a Table to explain the operation of the scrambling shown in FIG. 36;

FIG.38 shows how the video groups can be chosen for NTSC video signals;

FIG. 39 shows the transformed and scrambled versions of the line signals shown in FIG. 38; and FIG. 40 shows the relationship between the counting position CNT and the read address RA of the transform arrangement shown in FIG. 2, for NTSC video signals.

E. DESCRIPTION OF SOME EMBODIMENTS

E(1). General construction of the video recorder

Figure 1:
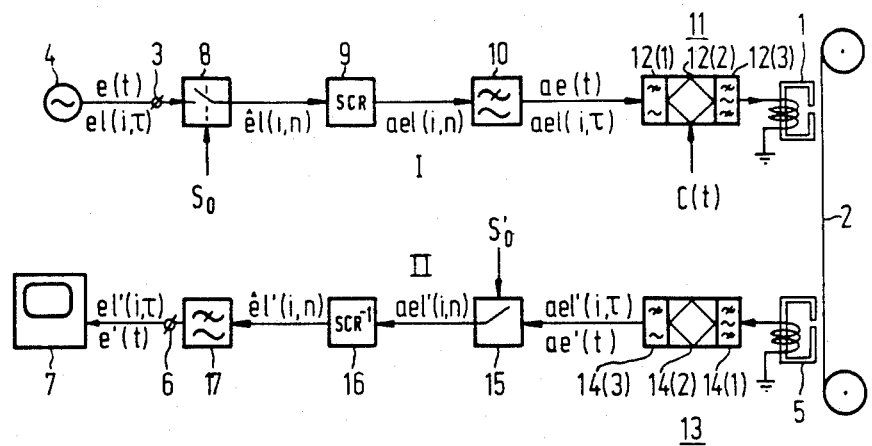
FIG. 1 shows schematically the general structure of a video recorder in accordance with the invention.

FIG. 1 shows schematically a video recorder of an embodiment in accordance with the invention. The recorder has a recording channel I which is coupled to a magnetic tape 2 through a recording head 1 and to which a composite color video signal e(t) produced by a video signal source 4 is applied by a recorder input 3. In addition, this video recorder has a display channel II, which is also coupled to the magnetic tape 2 by means of a play-back head 5 and which supplies at a recorder output 6 a composite color video signal which can be applied to a color TV receiver 7.

Generally, a color video signal is formed by the sum of a luminance signal y(t) and a chrominance signal chr(t) and can mathematically be written as:

$$e(t) = y(t) + chr(t) \quad (1)$$

The luminance signal y(t) has a frequency spectrum Y(f) located in the frequency band extending from 0 to approximately 5.5 MHz. This frequency spectrum Y(f) is schematically shown in FIG. 2.

The chrominance signal chr(t) is formed by a linear combination of two colour-information signals u(t) and v(t) which are defined by the respective expressions:

$$u(t) = u_o(t) \sin(2\pi f_{sc} t + \phi)$$

$$v(t) = \gamma v_o(t) \cos(2\pi f_{sc} t + \phi) \quad (2)$$

In these expressions $u_o(t)$ and $v_o(t)$ represent color difference signals which are proportional to the respective difference signals $b(t) - y(t)$ and $r(t) - y(t)$. The quantity b(t) represents the blue primary color signal and r(t) the red primary color signal. The quantity $f_{sc}$ is called the chrominance subcarrier frequency.

For PAL it now holds more specifically that $f_{sc}$ has the value 4.43 MHz; that $\gamma$ is alternatively +1 and −1 for consecutive line signals and that:

$$chr(t) = u(t) + v(t) \quad (3a)$$

For NTSC it holds that $f_{sc}$ has the value 3.58 MHz, that $\gamma = 1$ and that:

$$chr(t) = (\cos 33° - \sin 33°)u(t) + (\cos 33° + \sin 33°)v(t) \quad (3b)$$

By choosing the value of the chrominance subcarrier frequency as described above, the frequency spectrum CHR(f) of the chrominance signal is located, both for PAL and for NTSC, within the frequency band occupied by the luminance signal. Also this frequency spectrum CHR(f) is schematically shown in FIG. 2.

As has already been mentioned, a color video signal may also be considered as a sequence of line signals which each correspond to a picture line of the TV-picture and are each present during a line period $T_1$. It should be noted that the inverse quantity $1/T_1$ is denoted as the line frequency and will be designated by $f_1$ hereinafter. If further the $i^{th}$ line signal is represented by $el(i, \tau)$ then it holds that:

$$el(i, \tau) = e(iT_1 + \tau) = y(iT_1 + \tau) + chr(iT_1 + \tau) \quad (4)$$

$$o \leq \tau \leq T_1$$

$$i = \ldots -2, -1, 0, 1, 2, \ldots$$

In the recording channel I the color video signal e(t) is applied to a converter 8 which is here in the form of a sampling arrangement. Under the control of a sampling pulse $S_o$, samples are taken from a line signal el(i, $\tau$) at the instants $\tau_i + nT_s$, as a result of which each analog line signal is converted into a time-discrete line signal êl(i,n) which is formed by the line signal samples êl(i,n), which are defined by the expression:

$$êl(i,n) = el(i, \tau_i + nT_s) = e(iT_1 + \tau_i + nT_s) \quad (5)$$

In this expression it holds that: n = 0, 1, 2, ... $N_i - 1$ and that, for the relevant line signal $\tau_i$ and $N_i$ are characteristic constants. The quantity $N_i$ is determined on the one hand by $\tau_i$ and on the other hand by the sampling frequency $f_s$ at which the sampling pulses $S_o$ occur. Let it be assumed that $f_s = g/hf_1$, both g and h representing an integer, g being many times larger than h. It further holds that $T_s = 1/f_s$.

From the expressions (1) and (5) it follows that each line signal sample êl(i,n) may be considered as the sum of a luminance signal sample y(i,n) and a chrominance signal sample chr(i,n) so that:

$$êl(i,n) = y(i,n) + chr(i,n)$$

$$y(i,n) = y(iT_1 + \tau_i + nT_s)$$

$$chr(i,n) = chr(iT_1 + \tau_i + nT_s) \quad (6)$$

Thereafter, the time-discrete line signals are applied to a scrambler 9, whose construction and operation will be described in greater detail hereinafter. Here it should only be noted that the scrambler produces a sequence of time-discrete auxiliary line signals {ael(i,n)}, which each comprise a sequence of auxiliary-line signal samples ael(i,n), each sample being sum of an auxiliary luminance signal sample ay(i,n) and an auxiliary chrominance signal sample achr(i,n). More specifically, these auxiliary line signal samples ael(i,n) are formed by selecting those line signal samples which are associated with a group of time-discrete line signals, this selection being effected in accordance with a predetermined pattern. This pattern is chosen such that the resulting auxiliary line signal samples ael(i,n) have the following property. When each of the two color-difference signals $u_o(t)$ and $v_o(t)$ are the same for the considered group of line signals having the same amplitude for all these line signals, then the auxiliary chrominance signal samples achr (i,n) comprised in the auxiliary line signal {ael(i,n)} derived from such line signal samples will all have the same polarity.

Figure 3:
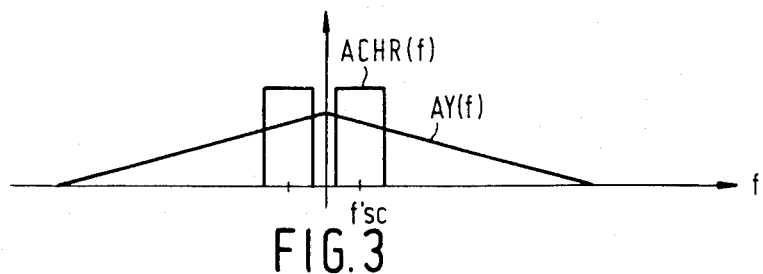
FIG. 3 shows schematically the frequency spectrum of the composite color video signal produced by the scrambler.

The time-discrete auxiliary-line signals thus obtained are applied to a converter 10, which converts each time-discrete auxiliary line signal into an analog auxiliary line signal ael(i, $\tau$). This converter 10 is here provided by a low-pass filter whose cut-off frequency has been chosen suitably, namely fs/2 MHz. The analog auxiliary line signals form together an analogue auxiliary color video signal ae(t) consisting of an auxiliary luminance signal ay(t) and an auxiliary chrominance signal achr(t). The frequency spectra of these signals will be denoted by AY(f) and ACHR(f), respectively, and these frequency spectra have approximately the shape shown in FIG. 3. It should be noted that due to the operation effected by the scrambler 9, the amplitude-modulated chrominance sub-carrier signal having the subcarrier frequency $f_{sc}$, is converted to a subcarrier frequency f'$_{sc}$ which is located within the frequency band of the auxiliary luminance signal ay(t) and at the low frequency end thereof. This converted subcarrier frequency f'$_{sc}$ is equal to the difference $f_s/2 - f_{sc}$ between the sampling frequency $f_s$ and the original chrominance sub-carrier frequency $f_{sc}$.

Thereafter, this analog auxiliary color video signal ae(t) is applied to a frequency-modulation circuit 11 provided by a cascade arrangement of a pre-modulation filter 12(1), an FM-modulator 12(2) and a post-modulation filter 12(3). The pre-modulation filter 12(1) has a passband extending from 0 Hz to approximately 3 MHz.

The post-modulation filter 12(3) has a passband which extends from approximately 0.2 MHz to approximately 7 MHz. A carrier signal c(t) which has a frequency of approximately 4 MHz is applied to the FM-modulator 12(2). The output signal of this frequency-modulation circuit 11 is applied to the recording head 1 and recorded on the magnetic tape 2.

By means of the play-back head 5, the information recorded on the magnetic tape 2 is converted into an electric signal which, inthe display channel II, is applied to a frequency-demodulation circuit 13 formed by a cascade arrangement of a pre-modulation filter 14(1), an FM-demodulator 14(2) and a post-modulation filter 14(3). The pre-modulation filter 14(1) has a passband which extends from approximately 0.2 MHz to approximately 7 MHz and the post-modulation filter 14(3) has a passband which extends from 0 Hz to approximately 3 MHz. This frequency-demodulation circuit produces an analog auxiliary color video signal ae'(t) which, when the transmission is absolutely undisturbed, is equal to ae(t). This analog auxiliary color video signal ae'(t), which is formed by a sequence of auxiliary line signals ael'(i, $\tau$), is applied to a converter 15, which is here alos in a form of a sampling arrangement. Under the control of sampling pulses S'$_o$, samples are taken from the auxiliary line signal ael'(i, $\tau$) at the instants $\tau_i + nT_s$, as a result of which each analog auxiliary line signal is converted into a time-discrete auxiliary line signal {ael'(i,n)} which is formed by the auxiliary line signal samples ael'(i,n). These time-discrete auxiliary line signals are applied to a descrambler 16 whose operation is the opposite to that of the scrambler 9. It produces the time-discrete line signals {êl'(i,n)}, which are each converted in a converter 17 into an analog line signal el'(i,$\tau$). Also this converter 17 is here in the form of a low-pass filter whose cut-off frequency is 5.5 MHz. The analog line signals thus obtained, which together represent an analog composite color video signal e'(t), are applied to the TV-receiver 7.

The construction of the scrambler 9 and the descrambler 16 are partly determined by the type of color video signal produced by the signal source 4. A distinction must be made between a PAL and an NTSC color video signal. Before going in further detail into this construction, a number of specific characteristics of these color video signals will first be described.

E(2). The PAL color video signal

For a PAL color video signal, there is a special relationship between the line frequency $f_1$ and the chrominance sub-carrier frequency $f_{sc}$. Ignoring a 25 Hz off-set component, it holds that:

$$f_{sc} = (q - \tfrac{1}{2})f_1 \tag{7}$$

Figure 4:
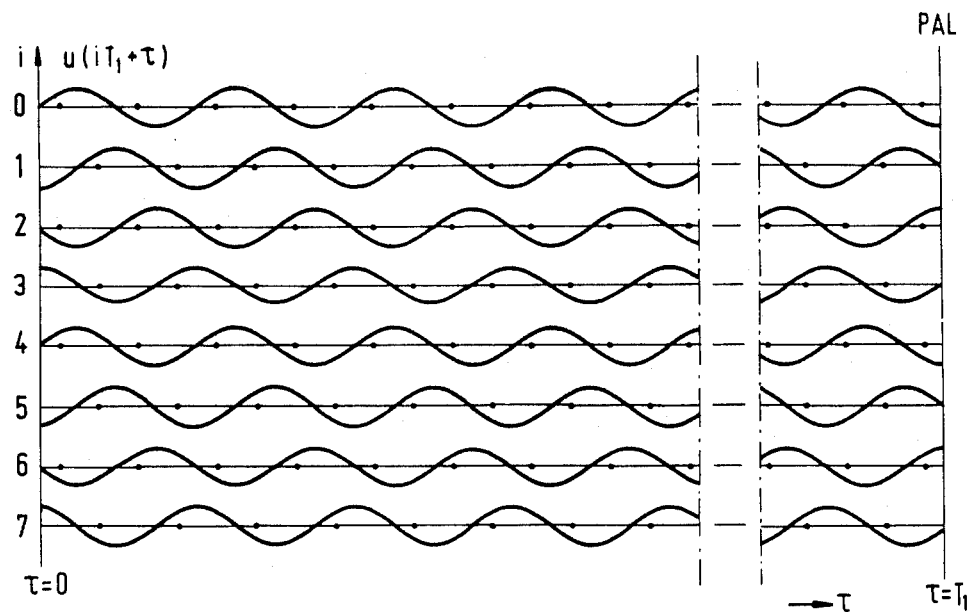
FIG. 4 shows the color information signal u(t) and FIG. 5 the color information signal v(t) of the chrominance signal for a PAL-color video signal.
Figure 5:
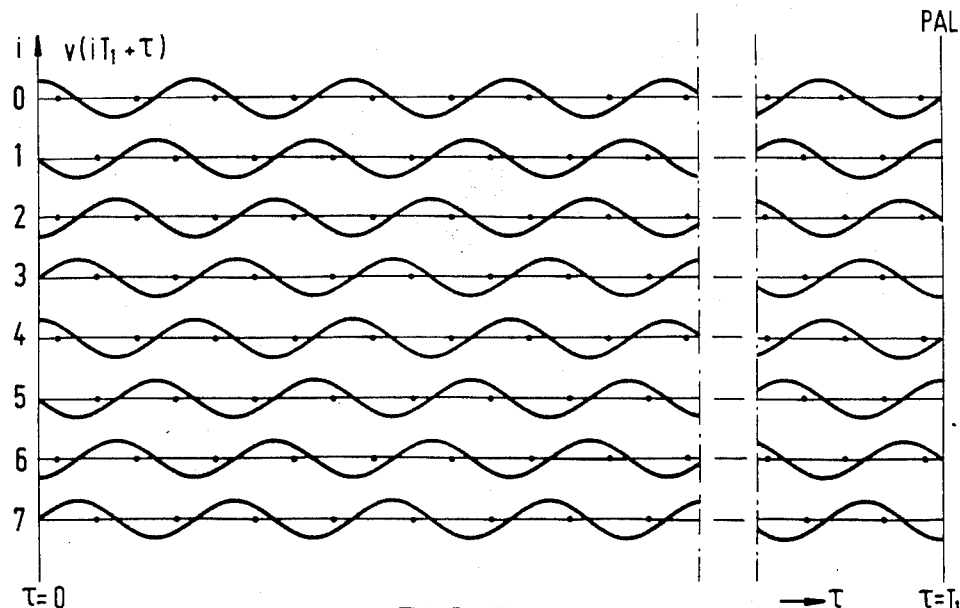

Herein q represent an integer which in practice is equal to 284. Starting from this relationship between $f_1$ and $f_{sc}$, the associated color information signals $u(iT_1+\tau)$ are shown in FIG. 4 for a number of line signals el(i, $\tau$). In a corresponding manner, FIG. 5 shows for the same line signals the associated color information signals $v(iT_1+\tau)$. For both Figures it is assumed that $\phi = 0$ and that $u_o(t) = U$ and $v_o(t) = V$ for all values of t.

Although the color video signal must in principle be sampled with a frequency which is at least twice the highest frequency occurring in this color video signal, it is demonstrated in reference 1 that in given circumstances the sampling frequency $f_s$ may be defined by the expression $f_s = 2f_{sc}$ so that the converted chrominance subcarrier frequency $f'_{sc} = 0$ (8)

Hereinafter it will be assumed that this expression (8) is satisfied. From the equations (2), (3), (4) and (6) it then follows that if $u_o(t) = U$ for all t $v_o(t) = V$ for all t (9)

, U and V being constants, it holds at the sampling instants $t = iT_1 + \tau_i + nT_s$ that $u(iT_1 + \tau_i + nT_s) = U \sin [2\pi f_{sc}(iT_1 + nT_s + \tau_i) + \phi]$ $v(iT_1 + \tau_i + nT_s) = \gamma V \cos [2\pi f_{sc}(iT_1 + nT_s + \tau_i) + \phi]$ (10)

The quantity $\tau_i$ must be chosen such that at these sampling instants, the argument $2\pi f_{sc}(iT_1 + nT_s + \tau_i) + \phi$ of each of the goniometric functions shown in expression (10), is equal to $\pi/4 + M\pi$, wherein M is an integer. If the phase angle $\phi = 0$ is chosen, it then follows from the above that:

$$\tau_i = \frac{3}{8} \; \frac{1}{f_{sc}} \text{ if } i \text{ is odd} \tag{11}$$

$$\tau_i = \frac{1}{8} \; \frac{1}{f_{sc}} \text{ if } i \text{ is even}$$

With this choice of both the sampling frequency and of $\tau_i$, the color information signal u(t) is, at the sampling instants, alternately $+\tfrac{1}{2}U\sqrt{2}$ and $-\tfrac{1}{2}U\sqrt{2}$, while the color information v(t) is alternately $+\tfrac{1}{2}V\sqrt{2}$ and $-\tfrac{1}{2}V\sqrt{2}$.

By way of illustration, dots in the FIGS. 4 and 5 indicate the instants at which the samples of the color information signals shown are taken. More specifically, of each line signal having an even number i, a total of 568 samples are taken, so that the associated $N_i = 568$. Of each line signal having an odd number i, 567 samples are taken, so that therefore it holds that the associated $N_i = 567$.

E(3). The NTSC color video signal

As for the PAL color video signal, there is also for the NTSC color video signal, a very special relationship between the chrominance sub-carrier frequency $f_{sc}$ and the line frequency $f_1$. It namely holds with NTSC that $$f_{sc} = (q - \tfrac{1}{2})f_1 \tag{12}$$

Figure 6:
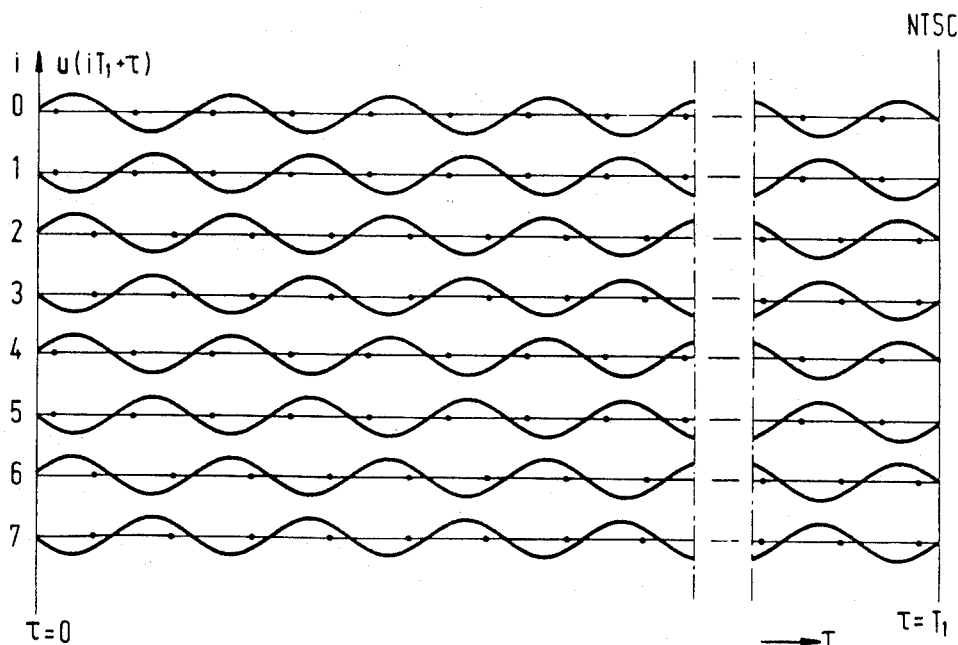
FIG. 6 shows the color information signal u(t) and FIG. 7 color information signal v(t) of the chrominance signal for an NTSC color video signal.
Figure 7:
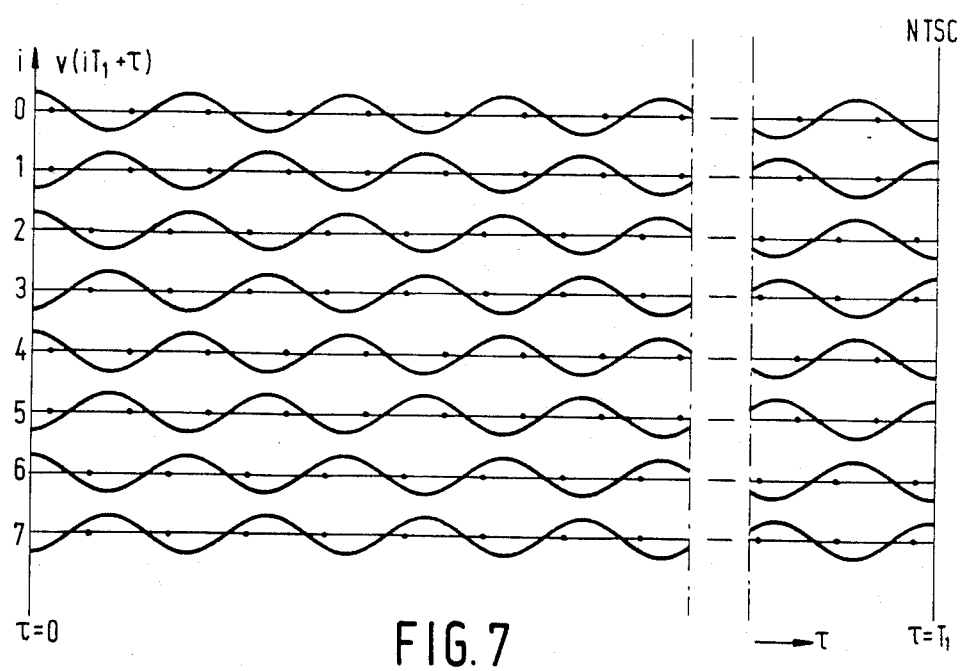

Also herein q represents an integer which in practice is equal to 228. Starting from this relationship, FIG. 6 shows for a number of line signals el(i, $\tau$) the associated color information signals $u(iT_1 + \tau)$ and FIG. 7 shows the associated color information signals $v(iT_1 + \tau)$. It is again assumed that:

$u_o(t) = U$ for all t $v_o(t) = V$ for all t (13)

and that $\phi = 0$

In reference 2 it is demonstrated that in given circumstances also for NTSC color video signals, the sampling frequency $f_s$ may be defined by expression (8). From the equations (2), (3) it follows that if expression (13) is declared valid, that then the color information signals at the sampling instants are defined by the expression (10), albeit that then therein $\gamma$ must be assumed to be equal to 1. The quantity $\tau_i$ must now be chosen such that at the sampling instants, the argument of each of the goniometric functions indicated in expression (10) are alternately first during two line signals equal to $+\pi/4+M\pi$ and then during two line signals equal to $+\frac{3}{4}\pi+M\pi$, M again representing an integer. For the event that the phase angle $\phi=0$ is chosen, it follows from the above that:

$$\tau_i = \frac{1}{8} \frac{1}{f_{sc}} \quad (14)$$

$$\tau_i = \frac{3}{8} \frac{1}{f_{sc}}$$

At the sampling instants, the color information signal $u(t)$ assumes alternately the value $+\frac{1}{2}\sqrt{2}$ and $-\frac{1}{2}U\sqrt{2}$, while the associated color information signal $v(t)$ is alternately $+\frac{1}{2}V\sqrt{2}$ and $-\frac{1}{2}V\sqrt{2}$.

By way of illustration, dots in the FIGS. 6 and 7 indicate the instants at which th samples of the color information signals shown are taken. More specifically, 445 samples are taken from each line signal, so that for each line signal the associated $N_i=455$.

E(4). The scrambler for PAL video signals

A scrambling operation is effected in the scrambler 9. The scrambler 9 produces time-discrete auxiliary line signals $\{ael(i,n)\}$ consisting of the auxiliary line signal samples $ael(i,n)$ which themselves are formed by the sum of an auxiliary luminance signal sample $ay(i,n)$ and an auxiliary chrominance signal sample $achr(i,n)$. These last-mentioned signal samples have the property that their polarity is the same when they belong to the same auxiliary line signal, and if the color difference signals $u_o(t)$ and $v_o(t)$ are constant for all those line signals $\hat{e}(i,n)$ from which the auxiliary line signal is derived. Although many types of scrambling operations are conceivable, only a few of them will be further described hereinafter.

A first scrambling operation will be described with reference to FIG. 8. Let it be assumed that all color difference signals are constant as defined by expression (9). FIG. 8 shows a number of line signals ($i=0, \ldots 7$) which are associated with a given field. More specifically, the position is shown of the signal samples $\hat{e}l(i,n)$ which are taken from these line signals and an indication is given that the polarity (and the value) of the chrominance signal sample $chr(i,n)=chr(iT_1+\tau_i+nT_s)$ associated with the relevant signal sample. Since each chrominance signal sample is defined by expression (3a), FIG. 8 follows directly from the FIGS. 4 and 5. In FIG. 8 the symbols a, b, c and d have the following meanings.

The symbol "a" indicates that for the relevant signal sample, the color information signals $u(t)$ and $v(t)$ are both positive, so that the associated chrominance signal sample is positive. These signal samples are said to belong to the signal samples of the class "a".

The symbol "b" indicates signal samples of the class "b". They are signal samples whose color information signals $u(t)$ and $v(t)$ are both negative, so that the associated chrominance signal samples are negative.

The symbol "c" indicates signal samples of the class "c". Of these signal samples the color information $u(t)$ is positive, while $v(t)$ is negative. The associated chrominance signal samples are then all either positive or negative.

The symbol "d" indicates signal samples of the class "d". Of these signal samples the color information $u(t)$ is negative, while $v(t)$ is positive. The associated chrominance signal samples are then all either negative or positive.

The auxiliary line signal $\{ael(i,n)\}$ can now, for example, be obtained by considering, of the line signals $\{el(i,n)\}$, and $\{el(i+2, n)\}$ those signal samples which all belong to the same class as the class to which the first signal sample $\hat{e}l(i,0)$ belongs, and by taking from them, alternately, a signal sample associated with the $i^{th}$ and a signal sample associated with the $i+2^{nd}$ line signal. This method is schematically shown in FIG. 8 by means of the sawtooth curve. Therein the signal samples are, for example, of the class "a" which are associated with the line signals $i=0$ and $i=2$ and which are interconnected by the curve A, form the auxiliary line signal $\{ael(0,n)\}$. The signal samples of the class "b" associated with the line signals $i=2$ and $i=4$ and interconnected by the curve B, form the auxiliary line signal $\{ael(2,n)\}$, etc. For the auxiliary line signal samples $ae(i,n)$ it can now mathematically be written:

$$ael(i,n) = \begin{cases} \hat{e}l(i,n) & \text{if } n = 0, 2, 4, 6, \ldots \\ \hat{e}l(i+2, n) & \text{if } n = 1, 3, 5, 7, \ldots \end{cases} \quad (15)$$

It can now be demonstrated that the above-described scrambling operation produces, at the output of the low-pass filter 10, an analog auxiliary color video signal $ae(t)$ whose frequency spectrum $AE(f)$ has roughly the shape shown at C in FIG. 9. More particularly, it can be proved that this frequency spectrum is roughly formed by the sum of two frequency spectra, namely the frequency spectrum $E'(f)$ shown at A in FIG. 9 and the frequency spectrum $\tilde{E}(f)$ shown at B in FIG. 9.

The frequency spectrum $E'(f)$ represents a filtered version of the original frequency spectrum $E(f)$ shown in FIG. 2. This filtering operation is a direct result of the scrambling procedure and is such that thereby the chrominance signal present in the video signal associated with this original frequency spectrum is suppressed.

The frequency spectrum $\tilde{E}(f)$ represents a filtered version of the sum of the two frequency spectra $E(f+f_{sc})$ and $E(f-f_{sc})$, which represent, respectively, a version shifted over a distance $-f_{sc}$ and a version shifted over a distance $+f_{sc}$ of the original frequency spectrum $E(f)$. Also here the filtering action is exclusively introduced by the scrambling procedure, which action has been found to be such that the luminance signal associated with this frequency spectrum is suppressed to a very great extent.

As can be seen from the frequency spectrum shown at C in FIG. 9, the frequency band occupied by the chrominance signal is now located around the frequency of zero Hz. It has also remained within the frequency band occupied by the luminance signal.

That this scrambling operation produces the above-described result can be demonstrated as follows: Let it be assumed that for all the scrambled line signals, $v_o(t)$ and $u_o(t)$ are constant, then all the chrominance signal samples of a line signal have the same values, but they are alternately positive and negative. So these chrominance signal samples represent a chrominance signal whose value varies with a frequency of $f_{sc}$. The scrambling operation results in an auxiliary line signal whose associated auxiliary chrominance signal samples have the same values and the same polarity. Thus, these auxiliary chrominance signal samples represent an auxiliary chrominance signal of a constant value.

A second scrambling operation, which produces a result which is comparable with the result obtained with the above-described first scrambling operation, is schematically shown in FIG. 10. As in FIG. 8, FIG. 10 shows a number of line signals associated with a given field, although this Figure shows more specifically the position of the signal samples êl(i,n) taken from each of these line signals. In this FIG. 10 the symbols "a", "b", "c" and "d" have the same meaning as in FIG. 8.

A third scrambling operation which also produces a result which is comparable with the result produced by the first scrambling operation is, to a limited extent, schematically shown in FIG. 11, to which reference is made for the sake of brevity.

It will be clear that to implement one of the above-described scrambling operations a specific construction of the scrambler 9 is required. Although this construction can be derived in a simple way from the scrambling operation to be implemented, FIG. 12 shows for the sake of completeness a scrambler arranged for effecting the first scrambling operation shown schematically in FIG. 8. It comprises a switch 901, shown symbolically only, whose output 902 is the output of the scrambler. In addition, it has two inputs 903 and 904. The input 903 is directly connected to the input of the scrambler and the input 904 is connected thereto through a delay device 905 which produces a time delay equal to two line periods ($2T_1$). Switch 901 and also the sampling arrangement 8 are controlled by the sampling pulses $S_o$ and that in such a way that in response to the first sampling pulse of a line signal, the output 902 of switch 901 is connected to the input 904 and in response to further sampling pulses alternately to input 903 and input 904.

As described in the foregoing, each of the scrambling operations has the advantageous property that the frequency band in which the chrominance signal is located is converted to lower frequencies. In practice it has however been found that such a scrambling operation negatively affects horizontal luminance transitions in the TV-picture. This can be demonstrated as follows. Let it be assumed that of the line signal samples shown in FIG. 8, the associated luminance signal samples are defined by the expression:

$$y(i,n) = \begin{cases} +k \text{ for } i = \ldots -2, -1, 0, 1, 2, 3, 4 \\ -k \text{ for } i = 5, 6, \ldots \end{cases} \quad (16)$$

The use of the scrambling operation shown in FIG. 8 results in the auxiliary luminance signal samples ay(4,n) of the auxiliary line signal {ael(4,n)} having alternately the value +k and −k. This means that the luminance signal $y(i,T_1+\tau)$, which was originally constant, is converted by this scrambling operation into an auxiliary luminance signal whose instantaneous value varies with a frequency $f_{sc}$. In other words, in a small frequency band around $f_{sc}$ not only information is now present about fast changes in the luminance signal but also about very slow changes in the luminance signal. This last-mentioned information is the information shown at B in FIG. 9 by means of the bell-shaped curves. As the premodulation filter 12(1) cuts-off all frequency components above 3 MHz, also the above-mentioned frequency component, located at $f_{sc}$, of the auxiliary luminance signal is cutoff. As a result thereof, important information for the reconstruction of horizontal transitions in the TV-picture are lost. It has been found that this can be prevented from occurring, in a manner as shown schematically in FIG. 13, by including in the recording channel I, preceding the scrambler 9, a transform arrangement 18, whose construction and operation will be further explained in the next paragraph. In a corresponding manner an inverse transformation arrangement 19 is included in the display channel II subsequent to the descrambler 16. As is shown in FIG. 13, the transform arrangement 18 produces time-discrete transformed line signals {êltr(i,n)} which are formed by $N_i$ transformed line signal samples êltr(i,n). Each transformed line signal sample êltr(i,n) is formed by the sum of a transformed chrominance signal sample chrtr(i,n) and a transformed luminance signal sample ytr(i,n). Each transformed line signal {êltr(i,n)} is further converted by the scrambler 9 into an auxiliary transformed line signal {aeltr(i,n)} which is further processed in the same way as the way in which the auxiliary line signal {ael(i,n)} is processed in the recorder shown in FIG. 1.

E(5). The transform arrangement, general introduction

The transform arrangement has for its object to prevent low-frequency luminance signal components from being shifted by the scrambling operation to a frequency band which is located outside the passband of the premodulation filter 12(1). This object can be accomplished by means of different transformation procedures. All these procedures have the following corresponding features.

Each line signal {êl(i,n)} is assumed to be divided into P contiguous, non-overlapping subgroups G(i,p); p=0, 1, 2, ... P−1. Such a subgroup comprises the Q consecutive video signal sample êl(i,pQ+q); q=0, 1, 2, ... Q−1.

In a first step a video group VG is assembled from R subgroups. For that purpose one from each of R line signals, a subgroup is selected in such a way that no subgroup is common to two or more video groups; in other words the video groups do not overlap, but each subgroup of a line signal forms part of a video group. Thus, such a video group may consist, of, for example,:

subgroup $G(i_1, p_1)$ of the line signal having ordinal number $i_1$
and subgroup $G(i_2, p_2)$ of the line signal having ordinal number $i_2$
and subgroup $G(i_3, p_3)$ of the line signal having ordinal number $i_3$
and subgroup $G(i_R, p_R)$ of the line signal having ordinal number $i_R$ More specifically, let it be assumed that the video signal samples of such a video group are arranged in accordance with the elements of a column vector. Such a column vector (video group) is shown in FIG. 14.

In a second step, or transformation step, each video signal sample of a video group is replaced by a transformed video signal sample which is equal to the sum of weighted versions of the video signal samples of the original video group, the weighting factors having values +1, +½, 0, −½, −1. This results in a transformed video group VGTR formed by R transformed subgroups GTR($i_r$, $p_r$), r=1, 2, 3, ... R which each comprise Q transformed video signal samples. Also of this transformed video group VGTR, let it be assumed that the component transformed video signal samples are arranged in accordance with the elements of a column vector. This vector then has the shape shown in FIG. 15. The relationship between these two column vectors VG and VGTR can now be described by means of a transformation matrix which will be denoted by the symbol H and has R×Q columns and rows, so that it holds that:

$$VGTR = H \times VG \quad (17)$$

The elements of this matrix H represent the above-mentioned weighting factors.

In a third step each transformed version of those subgroups which together form a given line signal are assembled to form the transformed line signal {êltr(i,n)}, in which the transformed subgroups are present in the same sequence as in which the original subgroups were present in the original line signal.

It should be noted that not all the video groups VG must be multiplied by the same transformation matrix. Two or even more transformation matrices may be associated with the transform arrangement. If there are, for example, two transformation matrices $H_o$ and $H_1$ associated with this transform arrangement, then it means that certain video groups are multiplied by $H_o$ and others by $H_1$.

For all these transformation matrices, the elements are chosen such from the group $+1, +\frac{1}{2}, 0, -\frac{1}{2}, -1$ that the transformed line signal {êltr(i,n)} has the following property. If the color difference signals $u_o(t)$ and $v_o(t)$ are constant for all those line signals which are taken into account in the transformation procedure, then each transformed line signal comprises regularly-spaced sequences of transformed line signal samples. These sequences are formed by two or more transformed line signal samples and the associated chrominance signal samples have the same polarity.

Although many transformation matrices which accomplish the desired object are conceivable, each transformation matrix resulting in a specific implementation of the transform arrangement, some of these transformation matrices and the consequent specific implementation of the transform arrangement will be further described hereafter.

E(6). Some transform arrangements for PAL

In a first transformation procedure use will be made of the fact that, as described in the foregoing, the scrambling operation is effected on signal samples of line signals having even ordinal numbers and separately on line signals having odd ordinal numbers. For that purpose let it be assumed that also the transformation procedure is effected on signal samples of line signals having even ordinal numbers, and in the same way separately on line signals having odd ordinal numbers. This first transformation procedure will be further described with reference to FIG. 16. In that Figure, as also, for example, in FIG. 8, the mutual position of the associated line signal samples êl(i,n) for a number of line signals having even ordinal numbers are denoted by dots. At each of these dots there are indicated the value a or b of the associated chrominance signal samples and, by means of a "+" the value +k and by means of a "−" the value −k of the associated luminance signal sample. Herein it is assumed that the color difference signals $u_o(t)$ and $v_o(t)$ are constant for all the line signals so that the absolute values of the quantities a and b are equal to each other. Of the associated luminance signal, it will be assumed that it is defined by expression (16). In this first transformation procedure, Q is chosen equal to 4, so that P=142. Each line signal is then divided into 142 subgroups, each having four line signal samples. The video groups are now chosen in the manner as schematically shown in FIG. 16. Therein R is chosen to be equal to 2, so that each video group comprises two subgroups. In particular the subgroup $G(i,p_r)$ and the subgroup $G(i+2, p_r)$ have been opted for.

The transformation matrix H used in the transformation step is shown in FIG. 17. By means of this transformation matrix, the line signals shown in FIG. 16 are converted into the transformed line signals shown in FIG. 18.

Figure 19:
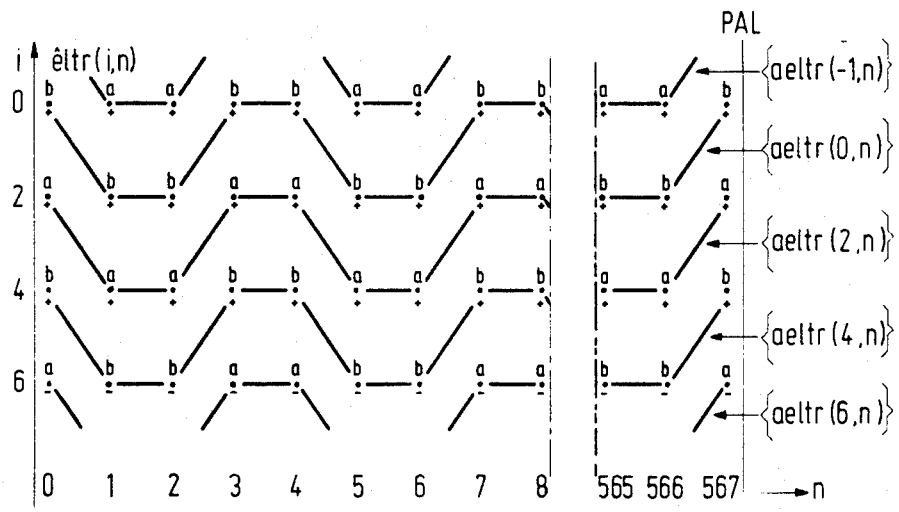

In order to convert these transformed line signals, by means of the scrambling operation, into auxiliary transformed line signals which have the property that the associated chrominance signal samples all have the same polarity, the scrambling operation shown schematically in FIG. 19 may, for example, be chosen. This scrambling operation results in inter alia the auxiliary transformed line signal {aeltr(4,n)} with the property that the associated luminance signal samples have alternately the value +k, +k and −k, −k. This means that the luminance signal $y(iT_1+\tau)$, which was originally constant, is converted by this transformation procedure and this scrambling operation into an auxiliary transformed luminance signal whose instantaneous value varies with a frequency $\frac{1}{4}f_{sc}$. As this frequency component is not cut-off by the premodulation filter 12(1), no important information required for the reconstruction of horizontal edges in the TV-picture is lost.

A transformation arrangement, whose structure is based on the transformation matrix shown in FIG. 17, and a scrambler for effecting the scrambling operation schematically shown in FIG. 19, are shown in FIG. 20. The transform arrangement 18 then comprises a video group —producing circuit 181, which produces the video group VG. In addition, it comprises an auxiliary transformer 182 which is controlled by clock pulses TP and produces, in accordance with the expression (17), the transformed video group VGTR. It also comprises a transformed line signal-producing circuit 183.

Both circuits 181 and 183 comprise two switches 1801, 1802 and 1803, 1804, respectively, shown symbolically only, and also two stores 1805, 1806 and 1807, 1808, respectively. The switches 1801 and 1802 are controlled by a two-level control signal $S_1$ and the switches 1803 and 1804 by a two-level control signal $S_1$. Each switch has a first switching position, shown in the Figure by I and a second switching position, shown in the Figure by II. The switches assume the first switching position I if the associated control signal has the logic value "1" and assume the second switching position II when that control signal has the logic value "0".

Each of the stores may be in the form of a RAM. They each have a data input D, a data output DO, a read-input, denoted by one of the symbols R, R', R, R', a write input, denoted by one of the symbols W, W', W, W', a read-address input, denoted by one of the symbols RA, RA, and a write-address input, denoted by one of the symbols WA, WA. Mutually inverted logic control signals are applied to the write input and to the read input of one and the same store. If, more specifically, a logic "1" is applied to the write input, then the information applied to the data-input D can be stored in a storage location of that store. The write address determines which storage location is used. If in contradistinction therewith a logic "1" is applied to the read input, then the information stored in a given storage location can be read and applied to the data output DO. The read address determines from which storage location information is read.

The different control signals, as well the read and write addresses, are generated by a control circuit 184. It comprises a first oscillator 1809, which produces the sampling pulses $S_o$ at a rate $2f_{sc}$, and a second oscillator 1811, which produces clock pulses CL at a rate equal to 568 times the line frequency $f_1$. The sampling pulses supplied by the first oscillator 1809 are applied to the counting input T of a modulo-2270-counter 1812 which can assume the counting positions 0, 1, 2, . . . 2269. These counting positions form the addresses for the stores. They are directly applied to the write address inputs WA of the stores 1805 and 1806 and, via a delay line 1813, to the read address inputs RA of the stores 1807 and 1808. A decoding network 1814, which produces a pulse each time the counter 1812 assumes the counting position "0" is connected to this counter 1812. These pulses are applied to a divide-by-two divider 1815 which thus produces, alternately, during 2270 consecutive sampling pulses, a logic "1" and thereafter, during 2270 consecutive sampling pulses, a logic "0". The output signal of this divide-by-two divider 1815 is the control signal $S_1$, which is applied to the switches 1801 and 1802. In addition, this output signal is also directly applied to the write input W of store 1805 and to the read input R' of store 1806. An inverted version, logically inverted by an inverter 1816, of the output signal from divide-by-two-divider 1815 is applied to the read input R of store 1805 and to the write input W' of store 1806. A delayed version, delayed by delay line 1817, of the output signal from divide-by-two divider 1815 is the control signal $S_1$ and is directly applied to the switches 1803 and 1804, as well as to the read input R of store 1807 and to the write input W' of store 1808. An inverted version, logically inverted in an inverter 1818, of this control signal $S_1$ is applied to the write input W of store 1807 and to the read input R' of store 1808.

The read addresses RA for the stores 1805 and 1806 and the write addresses WA for the stores 1807 and 1808 are generated by a cascade arrangement of a counter 1819 and an address generator 1820. Counter 1819 is a modulo-2272 counter which can assume the counting positions 0, 1, 2, 3, . . . 2271 and which, at its counting input T, receives the clock pulses CL produced by the second oscillator 1811. These counting positions are the addresses for the address generator 1820, which is in the form of a ROM. For each counting position, this ROM supplies a code word formed by an address code ADD and a transform pulse TP. FIG. 21 shows, for the sake of completeness, the relationship between the counting position of counter 1819, designated by CNT, and this address code ADD and transformation pulse TP. This address code ADD is directly applied to the read address inputs RA of the stores 1805 and 1806 and, via a delay line 1821, to the write address inputs WA of the stores 1807 and 1808.

The delay lines 1813, 1817, 1821 have each a time delay which is equal to the time delay introduced by the auxiliary transformer 182. In the case in which each video group is formed by eight line signal samples, as shown in FIG. 16, this time delay is $9T_s=9/(2f_{sc})$.

The auxiliary transformer 182 may be constructed in the manner shown in FIG. 22. It comprises a first shift register 1822 formed by eight shift register elements in each of which a line signal sample can be stored. The data input DI of this shift register 1822 is connected to the output of switch 1802. The content of these shift register elements are shifted under the control of the clock pulses CL produced by the oscillator 1811. By means of parallel outputs, these shift register elements are connected, via a matrix network 1823, to the parallel inputs of the shift register elements of a second shift register 1824, which is also formed by eight shift register elements. The information applied to the parallel inputs of the shift register elements of this second shift register 1824 is written into the relevant shift register elements each time the transformation pulse TP has the logic value "1". Thereafter the content of these shift register elements is serially shifted under the control of the clock pulses CL to the output DO of this shift register. This output DO is connected to the input of switch 1803.

The matrix circuit 1823 is formed by adders 1825, multipliers 1826, each having a multiplying factor $-1$, and multipliers 1827, each having a multiplying factor $\frac{1}{2}$. These elements are coupled to each other in such a way that the video group stored in the shift register 1821 is multiplied by the transformation matrix shown in FIG. 17.

The operation of the transform arrangement shown in FIG. 20 is now more specifically as follows. From the moment that $S_1$ is logic "1", the associated 2270 line signal samples êl(i,n) of four consecutive line signals are sequentially stored in the storage locations 0 to 2269, inclusive of, for example, the store 1805. Thereafter $S_1$ becomes logic "0" and from a further four consecutive line signals the 2270 line signal samples are sequentially stored in the storage locations 0 to 2269, inclusive of the store 1806. If $S_1$ is logic "0", the line signal samples stored in store 1805 in the storage locations having the address codes sequentially supplied by the address generator 1820 are simultaneously and sequentially applied to the first shift register 1822 of the auxiliary transformer 182. At the moment the transformation pulse TP is logic "1", this first shift register contains exactly one complete video group VG. This group is converted by the matrix circuit 1823 into a transformed video group VGTR, the component eight transformed line signal samples êltr(i,n) of which are stored in the eight shift register elements of the shift register 1824. Under the control of the clock pulses CL, they are thereafter sequentially applied to the output DO of this second shift register 1824 and stored in the store 1807. As the time delay of the delay lines 1813, 1817 and 1821 is equal to the time delay introduced by the auxiliary transformer 182, a transformed line signal sample is stored in a storage location of the memory 1807 which has the same address code as the storage location in which the original (non-transformed) line signal sample is stored in the store 1805. If now $S_1$ is a logic "1", the above-described operation is carried out on the line signal samples stored in the store 1806 and the content of the store 1807 is read at the same time. In this way the transformed line signals occur at the output of switch 1804, the line signals having even ordinal numbers being shown in FIG. 18.

The scrambling operation shown schematically in FIG. 19 is carried out on the transformed line signals thus obtained. This can be realized by means of the scrambler 9 which is also shown in FIG. 20 and has the same construction as the scrambler shown in FIG. 12. However, the switch 901 is controlled by a two-level control signal $S_2$. This signal occurs at the output of a delay line 1828 which, as have also the other delay lines 1813, 1817 and 1821, has a time delay $9/(2f_{sc})$. The input signal $S'_2$ of this delay line is also supplied by the decoding network 1814, which is connected to counter 1812. More specifically, $S'_2$ is logic "1" when counter 1812 is in one of the counting positions 0, 3, 4, 7, 8, 11, 12, ... 564, 567, 568, 571, 572, 576, ... In all other cases $S'_2$ is logic "0". If $S_2$ is logic "1" then switch 901 is in the switching position I. If in contradistinction therewith $S_2$ is logic "0", then this switch is in the switching position II.

The structure of the matrix circuit 1823 shown in FIG. 22 is based on the transformation matrix shown in FIG. 17. If this matrix circuit would be based on the transformation matrix shown in FIG. 23, then the transform arrangement shown in FIG. 20 would supply the transformed line signals shown in FIG. 24 (for the sake of clarity, in this FIG. 24 only the transformed line signals having even ordinal numbers are shown). In order to convert these transformed line signals into the desired auxiliary line signals the scrambling operation which is also shown in FIG. 24 must be carried out. Also this scrambling operation can be effected by means of the scrambler shown in FIG. 20, but this means that the control signal $S_2$ must be adapted.

In the foregoing, the scrambling operation and the transformation procedure are considered to be two independent procedures. However, the scrambling operation may sometimes also be considered as a second transformation procedure which is carried out on the original line signal samples or on the transformed line signal samples. In the latter case the scrambling operation (the second transformation procedure) can be combined with the original transformation procedure effected in the transform arrangement 18, so that the scrambler 19 can be dispensed with. As can be easily demonstrated, this situation can be obtained if the structure of the matrix circuit 1823 shown in FIG. 22 can be based on the transformation matrix shown in FIG. 25.

Figure 27:
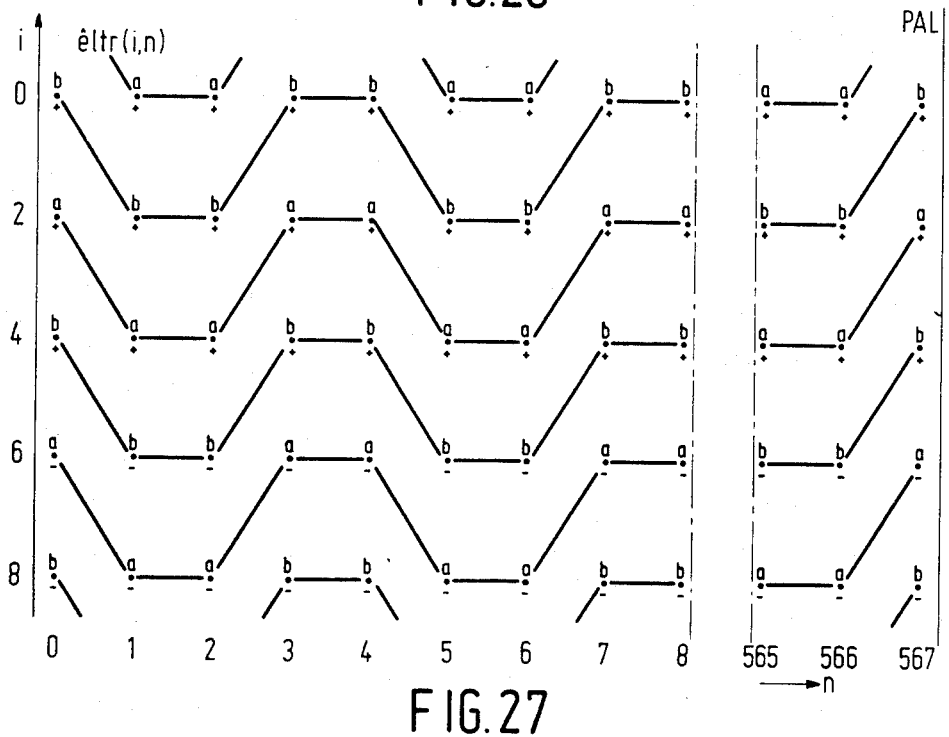
Figure 28:
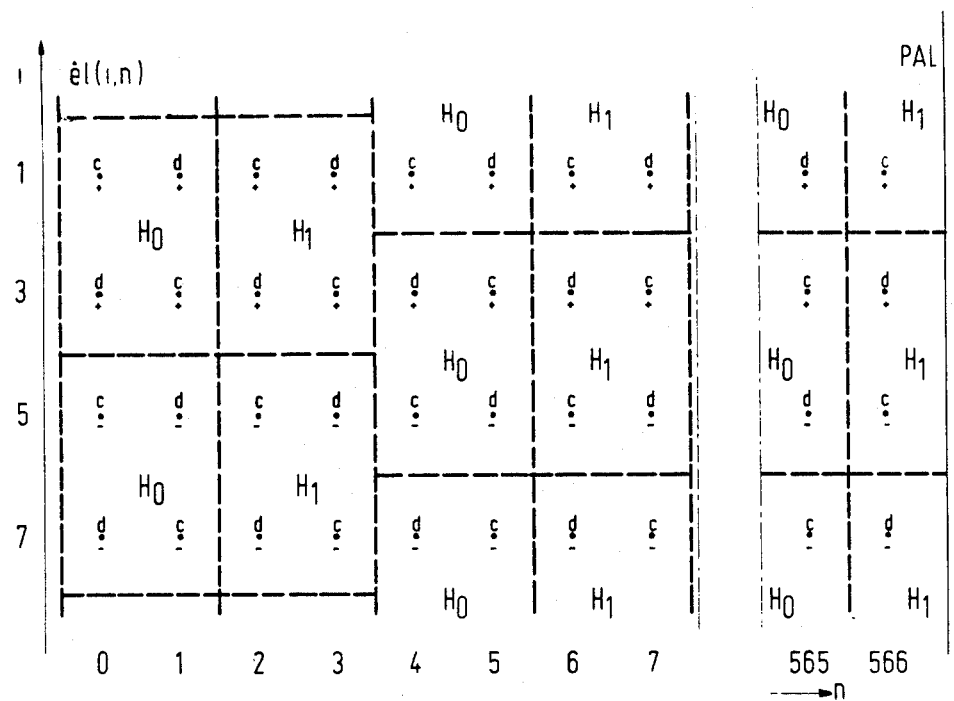
Figure 29:
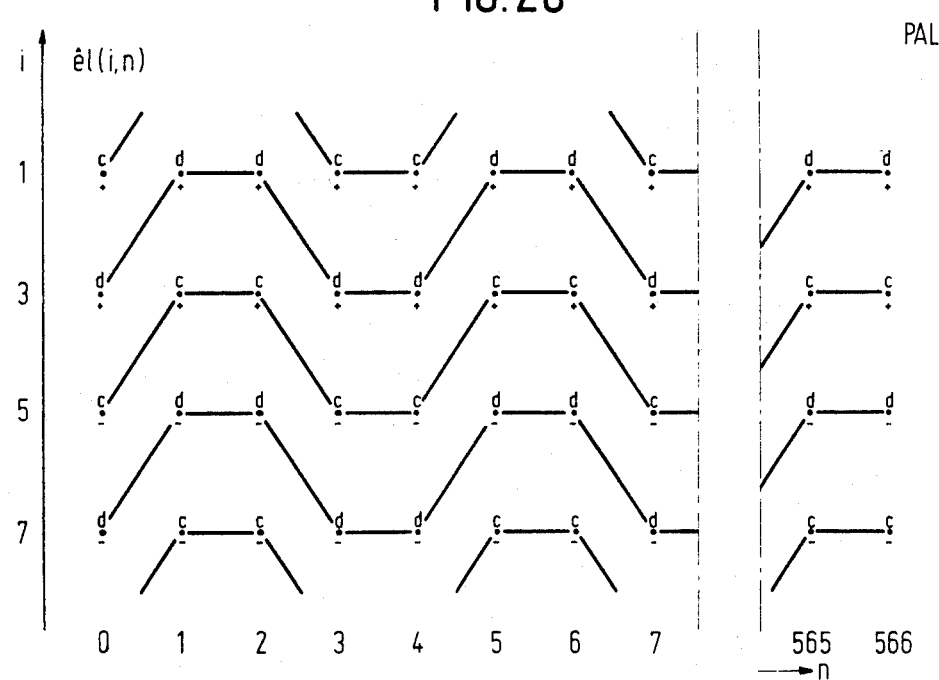

In the embodiments described in the foregoing, all the video groups are multiplied by the same transformation matrix. Hereafter, an embodiment will be described in which the certain video groups are multiplied by a first transformation matrix $H_o$ and other video groups by a second transformation matrix $H_1$. Before the transform arrangement based on these two transformation matrices will be described in detail, a description will first be given of the transformation procedure to be effected. For that purpose there are shown, in FIG. 26 for a number of line signals having even ordinal number and in FIG. 28 for a number of line signals having odd ordinal numbers, the mutual position of the associated line signal samples. For the different video groups, it will now be assumed that R=2 and Q=2, so that each video group is formed by four line signal samples and the mutual position of these video groups will be chosen in the manner shown in the FIGS. 26 and 28. In these Figures the transformation matrix is shown for each video group by which this group must be multiplied. Let $H_o$ be equal to the matrix shown in FIG. 30 and $H_1$ be the matrix shown in FIG. 31, then the line signals having even ordinal numbers (FIG. 26) are converted into the transformed line signals shown in FIG. 27 and the line signals having odd ordinal numbers are converted into the transformed line signals shown in FIG. 29. In order to derive from these transformed line signals the desired auxiliary transformed line signals, the scrambling operation which is schematically shown in FIG. 27 can be effected on the transformed line signals having even ordinal numbers, which are also shown in this Figure. The scrambling operation which is schematically shown in FIG. 29 can be effected on the transformed line signals having odd ordinal numbers, which are also shown in this Figure.

The transform arrangement, which operates in the above-described way and is based on the two transformation matrices $H_o$ and $H_1$ shown in FIGS. 30 and 31, is shown in FIG. 32. It comprises the video group-producing circuit 185 producing the video group VG, an auxiliary transformer 186, which is controlled by a control signal $S_4$ and whose structure is based on the transformation matrix $H_1$ shown in FIG. 31, and also a transformed line signal-producing circuit 187.

The video group-producing circuit 185 comprises a switch 1828, shown symbolically only, whose output is connected to the input of the auxiliary transformer 186. A first input of this switch is connected directly and a second input via a delay line 1829 to the input of the transform arrangement 18. This switch 1828 is controlled by a two-level control signal $S_3$.

The transformed line signal-producing circuit 187 comprises two switches 1830 and 1831. Switch 1830 is controlled by a two-level control signal $S_5$ and has two inputs. One of these inputs is connected directly and the other input via a delay line 1832 to the output of the auxiliary transformer 186.

Switch 1831, which is controlled by a control signal $S_6$, also has two inputs. One of these inputs is connected to the output of switch 1830, the other input via a delay line 1833 to the input of the transform arrangement 18.

The switches 1828, 1830 and 1831 have each a switching position I and a switching position II. They are adjusted to the switching position I when the associated control signal has the logic value "1". If, however, this control signal is logic "0", then the relevant switch is in the switching position II.

Each delay line 1829 and 1832 has a time delay equal to $2T_1-2T_2$. The time delay of the delay line 1833 is equal to $2T_1+2T_s$.

The different control signals $S_3, S_4, S_5, S_6$ are generated by a control circuit 188. This control circuit 188 comprises a generator 1809, which produces the sampling pulses $S_o$ occurring at a rate $2f_{sc}$, a generator 1834, which produces clock pulses at a rate $f_1$ (which is equal to the line frequency), and a generator 1835, which produces clock pulses at a rate equal to the field frequency (50 Hz). The sampling pulses produced by generator 1809 are applied to the clock pulse input T of a resettable counter 1836, which can be in the counting positions 0, 1, 2, 3, ... 565, 566, 567. Resetting this counter 1836 to the counting position 0 is effected in response to a clock pulse produced by generator 1834 and applied to the reset input R of this counter 1836. The clock pulses produced by generator 1834 are also applied to the clock pulse input T of a resettable divide-by-two divider 1837 which can supply the logic values "0" and "1" from its output. The clock pulses produced by generator 1835 are applied to the reset input R of this resettable divider 1837. The outputs of counter 1836 and divide-by-two divider 1837 are connected to inputs of an adder 1838 which produced an output number which is applied as an address code ADD to a storage means 1839, which is in the form of a ROM. The logic output value of divide-by-two divider 1837 is applied to adder 1838 in such a way that it is interpreted as the decimal value 0 if it is logic "0" and as the decimal value 2 if it is logic "1". Thus the address code ADD is either equal to the counting position of counter 1836 or to the counting position of this counter 1836 increased by an amount 2.

The storage means 1839 supplies the required control signals $S_3$, $S_4$, $S_5$, $S_6$ and a control signal $S_7$. The relationship between the address codes ADD and the binary value of the different control signals is shown in FIG. 33. In this Figure the address codes ADD are shown in a decimal notation and the asterisk indicates that the value of the control signal is at that moment of no consequence; that is to say it may be either logic "0" or logic "1".

It should be noted that the transformed line signal-producing circuit 187 also provided multiplication of those video groups which must be multiplied by the transformation matrix $H_o$ such as this matrix is shown in FIG. 30, as different line signal samples (êl(i,n)) are directly applied via the delay device 1833 to switch 1831 and consequently to the output of the transform arrangement.

Multiplying the different video groups by the transformation matrix $H_1$ shown in FIG. 31 is effected by means of the auxiliary transformer 186. A particularly efficient embodiment of this auxiliary transformer is shown in FIG. 34. It comprises a shift register 1840 having four shift register elements. Depending on the logic value of the control signal $S_4$, the information in this shift register 1840 can be shifted to the left or to the right. More specifically, this information is shifted to the right when $S_4$ is logic "0" and to the left when $S_4$ is logic "1". Shifting the information in this shift register is effected under the control of the sampling pulses $S_o$ which are produced at a rate $2f_{sc}$ by generator 1809. This shift register has two data inputs denoted by DI and DII, respectively. The data input DI is connected to the output of switch 1828 and thus receives the video group VG. The data input DII is connected to the output of the first shift register element. The output of this first shift register element is connected to an input of an adder 1842 via a constant-factor multiplier 1841. Further inputs of this adder 1842 are connected to outputs of the second, third and fourth shift register elements of shift register 1840. The output of adder 1842 is connected to a constant-factor multiplier 1843. This amplifier has a constant multiplying factor $\frac{1}{2}$, while the constant-factor multiplier 1841 has a multiplying factor $-1$.

For the sake of completeness, FIG. 32 also shows the scramble for effecting the scrambling operation as schematically shown in the FIGS. 27 and 29. This scrambler has the same construction as the scramblers shown in FIGS. 12 and 20. The switch 901 is now however controlled by the control signal $S_7$ mentioned in the foregoing.

E(7). Video recorder for NTSC video signals.

Also for NTSC video signals, many scrambling operations are possible to obtain auxiliary line signals whose associated chrominance signal samples all have the same polarity. A scrambling operation suitable for NTSC video signals is schmatically shown in FIG. 35, which Figure requires no further description on account of what has been described already in the foregoing. The scrambler for effecting this scrambling operation is shown in FIG. 36. It is of a similar construction as the video group-producing circuit 181 used in the transform arrangement 18 and shown in FIG. 20. Thus, it comprises two switches 906 and 907 which are only shown symbolically, as well as two stores 908 and 909. The two switches are controlled by a two-level control signal $S_8$. Each switch has a switching position I and a switching position II. It is adjusted to the switching position I shown in the Figure when the associated control signal has the logic value "1" and it is adjusted to the switching position II when that control signal has the logic value "0".

Each store is now also preferably in the form of a RAM, having a capacity for storing the line signal samples of two consecutive line signals (910 line signal samples). These line signal samples are applied to these stores via their respective data inputs D. In the manner already described, these stores have a write input W and W', respectively, a write address input WA, a read input R and R', respectively, and a read address input RA. The different control signals and the read and write addresses are generated by a control circuit 91. Also this control circuit 91 comprises a generator 910 which produces sampling pulses $S_o$ at a rate $2f_{sc}$. These pulses are applied to a modulo-910-counter 911 which can be in the counting positions 0, 1, 2, 3, ... 909. These counting positions, which will be denoted by ADCNT are addresses for the stores 908 and 909 and are directly applied to their write address inputs WA. To generate the read addresses these counting positions are also applied to the address input of a store 912 which is in the form of a ROM. In each storage location of this ROM, a read address is stored which, after activation of that storage location, is applied to the read address inputs RA of the stores 908 and 909. FIG. 37 shows, for the sake of completeness, the relationship between the counting position ADCNT of counter 911 and the read address RA. This FIG. 37 also shows which line signal sample êl(i,n) appears as an auxiliary line signal sample ael(i,n) at the scrambler output in response to a predetermined counting position.

A decoding network 913, which produces a pulse each time the counter is adjusted to the counting position "0", is connected to the counter 911. These pulses are applied to a divide-by-two divider 914 which thus alternately supplies first the logic value "1" during two consecutive signals and thereafter, during two consecutive line signals, the logic value "0". This output signal from divide-by-two divider 914 represents the control signal $S_8$ which is applied to the switches 906 and 907. In addition, this output signal from divide-by-two divider 914 is directly applied to the write input W of store 908, to the read input R' of store 904 and, via an inverter 915, to the read output R of store 908 and to the write input W' of store 909.

As will be obvious from FIG. 35, also now information is lost which is required for the reconstruction of vertical transitions (luminance transitions) in the TV-picture. It is therefore also now advantageous to use a transform arrangement in which the transformation procedure defined in paragraph E(5) is effected. Also in this case, many transformation procedures are conceivable which lead to the desired result. It is then again possible to base the transformation step on a transformation matrix of such a type that the transformation matrix simultaneously effects the transformation procedure and the scrambling operation.

In a transform arrangement in which the transformation procedure and the scrambling operation are simultaneously effected, the video groups must be chosen in the manner as shown schematically in FIG. 38. The values $R=2$ and $Q=4$ are opted for, so that each video group contains two subgroups, namely the subgroup G($i_1$, $P_r$) and the subgroup G($i_1+1$, $p_r$), which each have four line signal samples. The matrix shown in FIG. 25 may now be chosen as the transformation matrix. In this way the auxiliary transformed line signals aeltr(i,n), shown in FIG. 39, are obtained. The transform arrangement operating in this manner may have the same construction as the transform arrangement shown in FIG. 20. However, it then holds more specifically that:

counter 1812 must be in the form of a modulo-910 counter which is capable of occupying the counting positions 0, 1, 2, 3, . . . 909;

generator 1811 must produce clock pulses at a rate $456f_1$;

counter 1819 must be in the form of a modulo-912 counter which is capable of occupying the counting positions 0, 1, 2, 3, . . . 911;

the content of the ROM 1820 must be chosen such that between the counting position CNT of counter 1819 and the read address RA, there is the relationship shown in FIG. 40;

E(8). General Remarks.

In the FIGS. 1 and 13, it was assumed that the arrangement for converting an analog signal into a time-discrete signal is only formed by a sampling arrangement 8. In practice it will however usually form part of an analog-to-digital converter. In that case the low-pass filter 10 must then be preceded by a digial-to-analog converter which converts the time-discrete signal into a time-continuous (analog) signal.

The descramblers shown in the FIGS. 1 and 13 may be of exactly the same construction as the scramblers 9.

Also the inverse transform arrangement 19 shown in FIG. 13 may have exactly the same implementation as the transform arrangement 18.

In the embodiment shown, both the scrambling operation and the transformation procedure are effected on video signal samples associated with one specific picture. They may, however, alternatively be effected on video signal samples associated with different pictures.

What is claimed is:

1. A video signal processing circuit for preparing an analog color video signal for recording on a recording medium, such analog color video signal comprising, for each line of a video image, an analog color video line signal having a luminance signal component in a predetermined frequency band and a color subcarrier modulated by a chrominance signal component, the modulated subcarrier having a predetermined frequency band at the upper end of the luminance signal frequency band, such signal processing circuit comprising:

(a) a recording signal input for receiving the analog color video signal;

(b) a converter having an input coupled to the recording signal input and an output, said converter sampling each analog color line signal to form it into a time discrete color video line signal comprising a number of successive samples occurring at a sampling rate $f_s$ approximately twice that of the subcarrier frequency, such number being $N_i$ for the $i^{th}$ time discrete color video line signal;

(c) scrambler circuit means having an input coupled to the output of said converter and an output, said scrambler circuit means selecting, in accordance with a predetermined pattern, a number of said time discrete video line signal samples selected from predetermined ones of said time discrete video line signals supplied thereto of a like polarity, such selected samples constituting a time discrete auxiliary line signal corresponding to such video line signals, the $i^{th}$ time discrete auxiliary line signal comprising $N_i$ of such signal samples for each of said auxiliary line signals whereby said chrominance signal frequency band is shifted to the lower portion of said luminance signal frequency band;

(d) means for converting each of said time discrete auxiliary line signals into an analog signal; and (e) frequency modulation means connected to said converting means for frequency modulating the analog signals produced thereby on a carrier wave, the resulting frequency modulated carrier wave being suited for recording on said recording medium.

2. A video recorder as claimed in claim 1, in which each time-discrete line signal is assembled from a sequence of P non-overlapping sub-groups G(i,P); P=0, 1, 2, 3, . . . P−1, wherein i= . . . −2, −1, 0, 2, . . . represents the ordinal number of the line signal, and each sub-group comprises Q consecutive video signal samples of that line signal, and the scrambler is preceded by a transform means for performing a transformation procedure consisting of the following steps:

a. a video grouping step for assembling a video group VG consisting of R subgroups, a video group being selected from each of R time-discrete line signals and no subgroup being common to two or more video groups;

b. a transformation step for replacing each video signal sample of a video group VG by a transformed video signal sample which is equal to the sum of weighted versions of the video signal samples of the original video group, the weighting factors having values from the set $+1$, $+\frac{1}{2}$, 0, $-\frac{1}{2}$, $-1$ for generating a transform video group VGTR consisting of R transformed subgroups;

c. a transformed line signal-producing step for forming a transformed line signal from the transformed versions of both subgroups which together originally form a particular line signal, in each transformed line signal the transformed subgroup being present in the same sequence as in which the original subgroup were present in the original line signal.

3. A video recorder as claimed in claim 2, the scrambler and the transform means are combined to form one unit in which the transformation step and the scrambling operation are combined.

4. The video signal processing circuit of claim 1, wherein the time discrete color video signal produced by said converter has a luminance signal component which is amplitude independent, and further comprising a transformation circuit connected to the output of said converter, said transformation circuit transforming said luminance signal from an amplitude independent signal to a signal having an amplitude which varies with a frequency of one half the frequency of a subcarrier wave associated with a chrominance component of said time discrete color video signal, whereby low frequency components of said luminance signal component are not frequency shifted outside the passband of said frequency modulation means.

5. A playback apparatus for recovering an analog color video signal from an FM wave formed therefrom and recorded on a storage medium, such recorded FM wave having been formed by sampling such analog color video signal at a rate approximately twice the frequency of a color subcarrier thereof so as to form time discrete video line signals comprising discrete samples of successive lines of said video signal, selecting a number of such samples from predetermined ones of said time discrete video line signals having a like polarity to form time discrete auxiliary line signals having a luminance signal frequency band and a chrominance signal frequency band at the lower end of the luminance signal frequency band, converting such time discrete auxiliary line signals into analog auxiliary line signals, and frequency modulating such analog auxiliary line signals on a carrier wave to form said recorded FM wave, said apparatus comprising:

- a transducer for reading said recorded FM wave from said storage medium;
- a frequency demodulator connected to said transducer to receive said FM wave and which recovers the modulating wave therefrom, thereby reproducing said analog auxiliary line signals;
- a converter connected to said frequency demodulator to receive said analog auxiliary line signals therefrom and convert them into a number of time discrete auxiliary line signal samples occurring at a sampling rate $f_s$ approximately twice the frequency of said color subcarrier, such number of signal samples being $N_i$ for the $i^{th}$ time discrete auxiliary line signal;
- a descrambler connected to said converter to receive such time discrete auxiliary line signal samples, said descrambler selecting certain of such signal samples in a predetermined pattern so as to form said time discrete video line signals therefrom, the $i^{th}$ time discrete video line signal having $N_i$ of such signal samples; and
- means for converting said time discrete video line signals into analog signals constituting said color video signal of said recorded FM wave.

6. The playback apparatus of claim 5 further comprising an inverse transformation means connected to transform luminance signal components in said time discrete line signals which vary as a function of the frequency of a subcarrier signal associated with said chrominance signal to a signal substantially independent of said subcarrier signal frequency.

* * * * *